US009875725B2

(12) United States Patent
Ikenaga et al.

(10) Patent No.: US 9,875,725 B2
(45) Date of Patent: Jan. 23, 2018

(54) INFORMATION PROCESSING TO EXCHANGE INFORMATION VIA WIRELESS COMMUNICATION

(71) Applicant: Sony Corporation, Tokyo (JP)

(72) Inventors: Yoshihiko Ikenaga, Tokyo (JP); Yasushi Katayama, Tokyo (JP); Sho Amano, Kanagawa (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/072,347

(22) Filed: Nov. 5, 2013

(65) Prior Publication Data

US 2014/0132536 A1   May 15, 2014

(30) Foreign Application Priority Data

Nov. 12, 2012   (JP) .................................. 2012-247981

(51) Int. Cl.
| | |
|---|---|
| *G06F 3/0484* | (2013.01) |
| *G09G 5/12* | (2006.01) |
| *H04M 1/725* | (2006.01) |
| *G06F 3/0488* | (2013.01) |
| *G06F 3/038* | (2013.01) |
| *G06F 3/14* | (2006.01) |

(Continued)

(52) U.S. Cl.
CPC ............... *G09G 5/12* (2013.01); *G06F 3/017* (2013.01); *G06F 3/038* (2013.01); *G06F 3/0414* (2013.01); *G06F 3/0488* (2013.01); *G06F 3/1423* (2013.01); *G09G 5/14* (2013.01); *H04M 1/7253* (2013.01); *G06F 2203/0383* (2013.01); *G09G 2340/02* (2013.01); *G09G 2340/12* (2013.01); *G09G 2354/00* (2013.01); *G09G 2370/16* (2013.01); *H04M 2250/22* (2013.01)

(58) Field of Classification Search
CPC .................................................. G06F 3/04845
USPC .......................................................... 345/173
See application file for complete search history.

(56) References Cited

U.S. PATENT DOCUMENTS

| | | | |
|---|---|---|---|
| 2002/0132609 A1* | 9/2002 | Lewis ..................... | H04L 51/30 455/412.1 |
| 2004/0145660 A1* | 7/2004 | Kusaka .............. | H04N 1/00315 348/211.2 |

(Continued)

FOREIGN PATENT DOCUMENTS

JP    2008-278388 A    11/2008

OTHER PUBLICATIONS

Final Office Action cited in U.S Appl. No. 15/209,459 dated May 31, 2017, 13 pages.

*Primary Examiner* — Jennifer Mehmood
*Assistant Examiner* — Carl Adams
(74) *Attorney, Agent, or Firm* — Chip Law Group

(57) ABSTRACT

There is provided an information processing device including an operation acceptance unit configured to accept a user operation related to an image based on image data received from another information processing device using short-range wireless communication when the image is displayed on a display unit, and a controller configured to perform control in a manner that notification information for issuing a notification that the user operation is accepted is output when the user operation is accepted, and control data corresponding to the user operation is transmitted to the other information processing device.

18 Claims, 19 Drawing Sheets

(51) Int. Cl.
  *G09G 5/14* (2006.01)
  *G06F 3/01* (2006.01)
  *G06F 3/041* (2006.01)

(56) References Cited

U.S. PATENT DOCUMENTS

| | | | |
|---|---|---|---|
| 2009/0303199 A1* | 12/2009 | Cho | G06F 3/04883 345/173 |
| 2010/0002122 A1* | 1/2010 | Larson | H04N 5/23293 348/333.01 |
| 2010/0214465 A1* | 8/2010 | Suzuki | G06F 3/04886 348/333.02 |
| 2010/0271390 A1* | 10/2010 | Tran | G06F 3/1454 345/619 |
| 2011/0199386 A1 | 8/2011 | Dharwada | |
| 2013/0135352 A1* | 5/2013 | Matsuda | G06F 3/14 345/659 |
| 2013/0239056 A1* | 9/2013 | Ubillos | G06T 11/60 715/833 |
| 2014/0059139 A1* | 2/2014 | Filev | G06Q 50/01 709/205 |

* cited by examiner

FIG.6
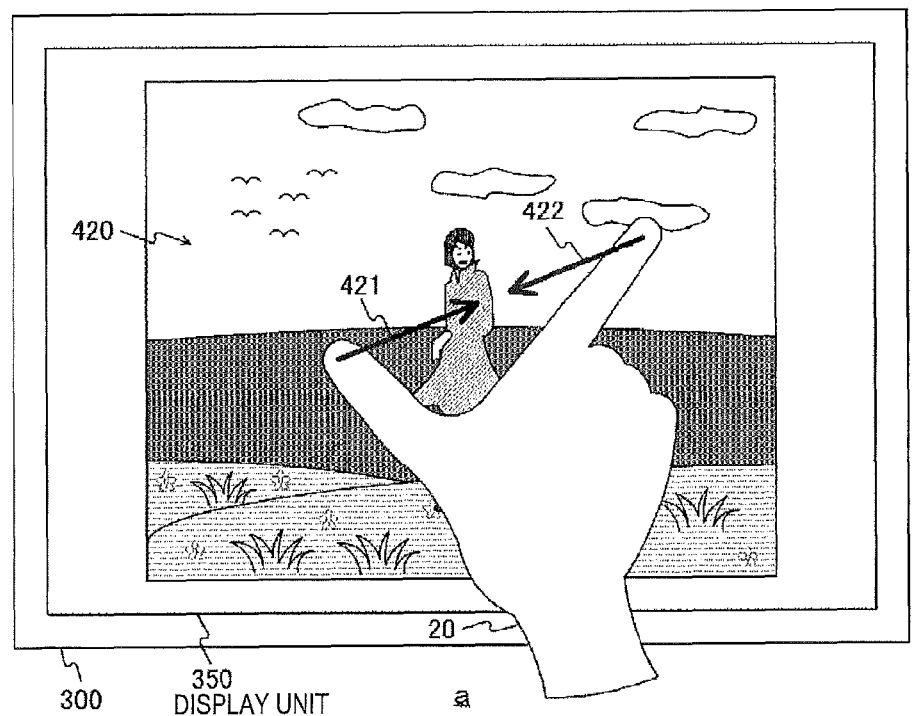
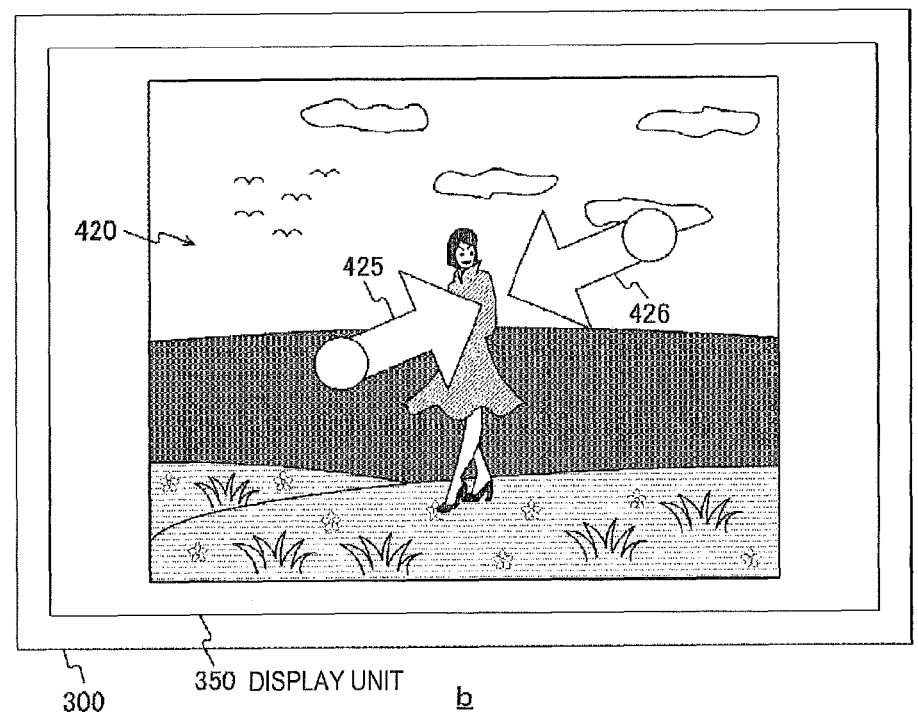

FIG.7
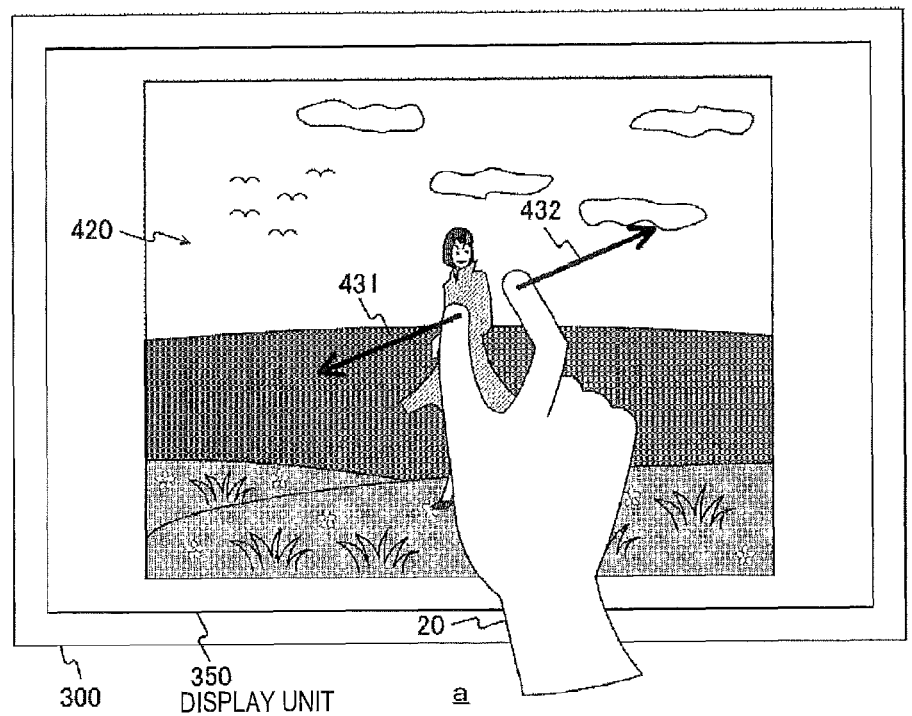
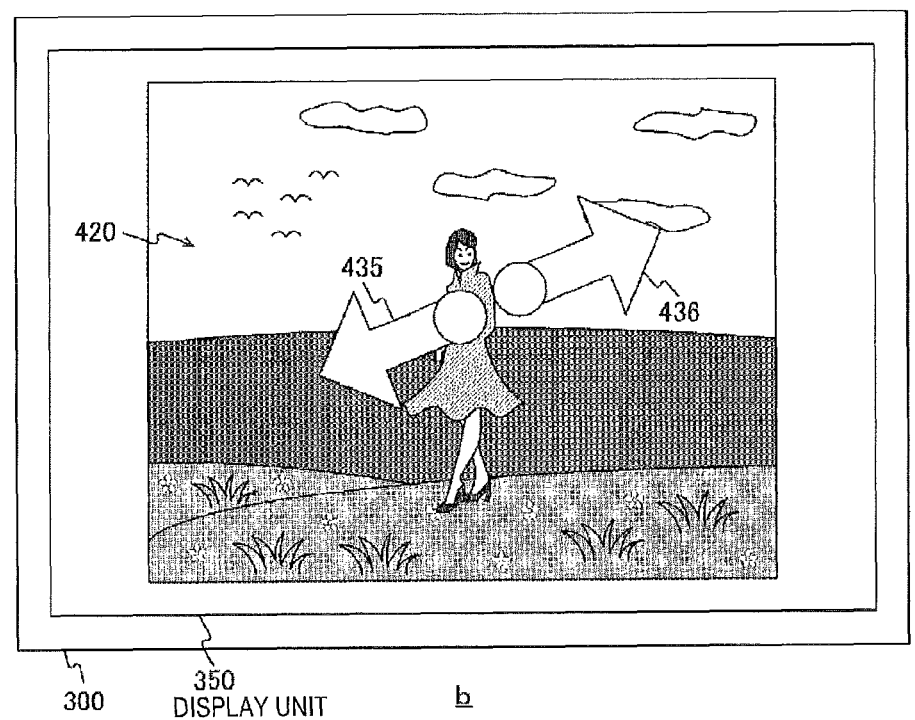

FIG.9
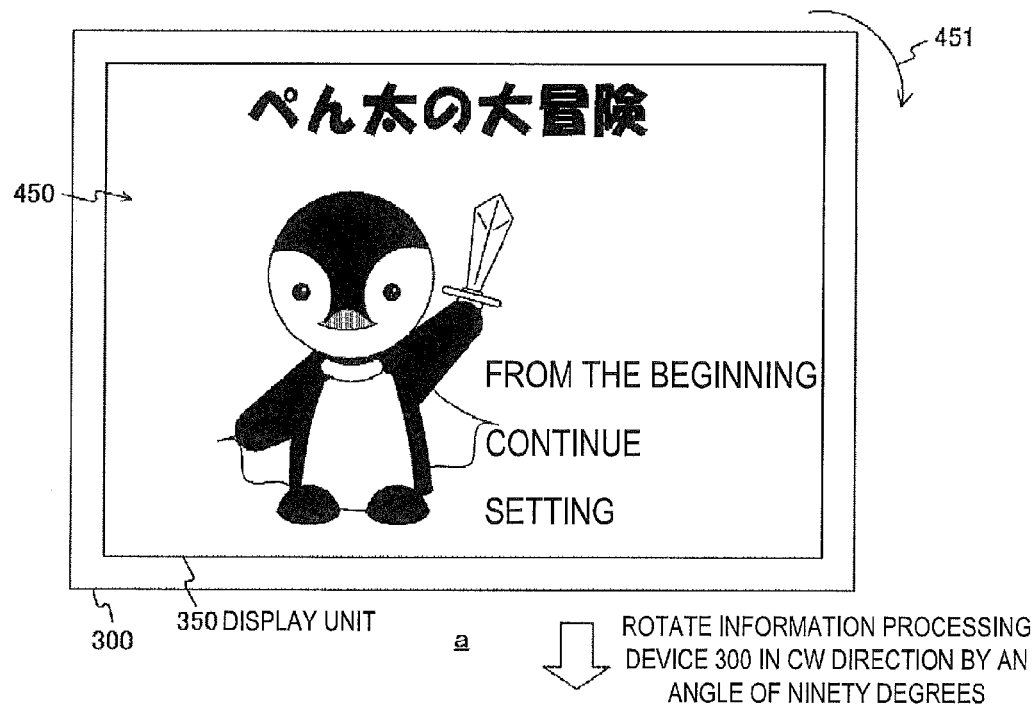
a
⬇ ROTATE INFORMATION PROCESSING DEVICE 300 IN CW DIRECTION BY AN ANGLE OF NINETY DEGREES
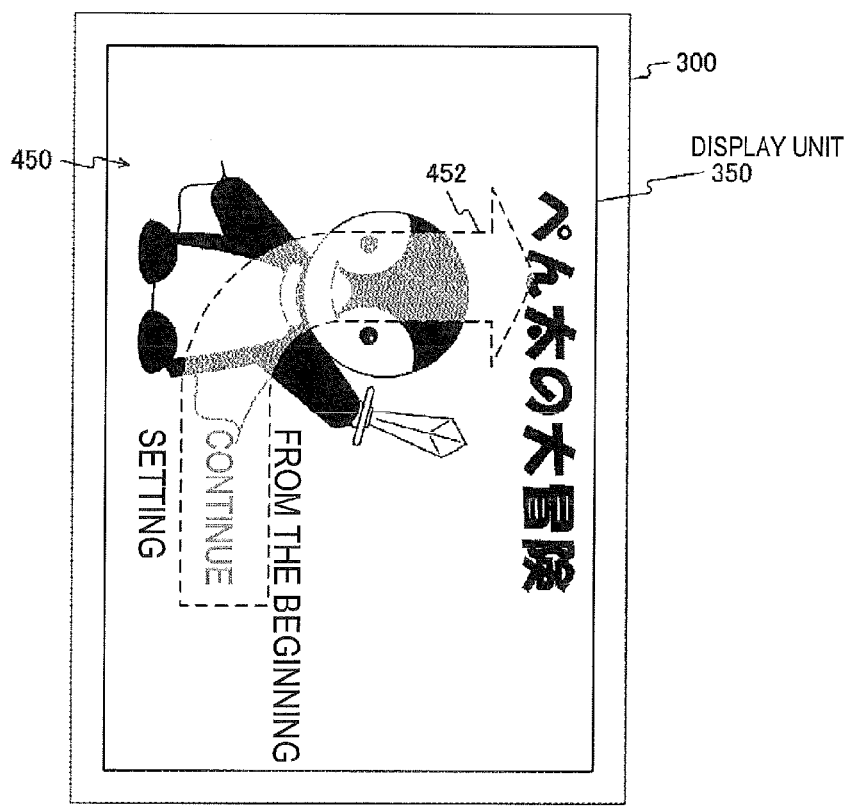
b

INFORMATION PROCESSING TO EXCHANGE INFORMATION VIA WIRELESS COMMUNICATION

CROSS REFERENCE TO RELATED APPLICATIONS

This application claims the benefit of Japanese Priority Patent Application JP 2012-247981 filed Nov. 12, 2012, the entire contents of which are incorporated herein by reference.

BACKGROUND

The present technology relates to an information processing device, and more particularly to an information processing device, communication system, and information processing method in which various types of information are exchanged using wireless communication.

In related art, wireless communication techniques in which various types of data are exchanged using wireless communication have been known. For example, there has been proposed an information exchange device in which various types of data are exchanged between two wireless communication devices via short-range wireless communication (for example, refer to Japanese Unexamined Patent Application Publication No. 2008-278388).

SUMMARY

According to the above-described technique in related art, various types of data can be exchanged between two wireless communication devices via short-range wireless communication without using a wire line. However, when various types of data are exchanged between two wireless communication devices in this way, there may be a delay due to short-range wireless communication.

In this context, as an example, in a reception-side information processing device that displays an image based on image data transmitted from a transmission-side information processing device on a display unit, it is assumed that the user performs an operation input for performing an operation related to the image. In this case, it is assumed that a time until an image based on image data reflecting the operation input is displayed on a display unit is delayed by the amount of delay. In this way, as the time until an image reflecting the operation input is displayed becomes long, it is difficult for the user to recognize quickly whether the operation input is properly accepted, and thus an erroneous operation such as performing again an operation input is more likely to occur.

An embodiment of the present technology has been made in view of such a situation. It is desirable for the user to easily recognize an acceptance condition of a user operation.

According to a first embodiment of the present technology, there is provided an information processing device including an operation acceptance unit configured to accept a user operation related to an image based on image data received from another information processing device using short-range wireless communication when the image is displayed on a display unit, and a controller configured to perform control in a manner that notification information for issuing a notification that the user operation is accepted is output when the user operation is accepted, and control data corresponding to the user operation is transmitted to the other information processing device. As a result, in a case where an image based on image data received from another information processing device using short-range wireless communication is displayed on a display unit, when a user operation related to the image is accepted, notification information for issuing a notification that the user operation is accepted can be output, and control data corresponding to the user operation can be transmitted to the other information processing device.

Further, according to the embodiment, the controller may cause the notification information to be output by superimposing an additional image indicating that the user operation is accepted on the image displayed on the display unit. As a result, the additional image indicating the acceptance of the user operation can be displayed by superimposing it on the image displayed on the display unit.

Further, according to the embodiment, the operation acceptance unit and the display unit may include a touch panel. The user operation may be a contact operation or a proximity operation to the touch panel. The controller may cause the additional image to be displayed by using a position in the touch panel at which the contact operation or the proximity operation is accepted as a reference when the contact operation or the proximity operation to the touch panel is accepted. As a result, the additional image can be displayed by using the position in the touch panel at which the contact operation or the proximity operation is accepted as a reference when the contact operation or the proximity operation to the touch panel is accepted.

Further, according to the embodiment, the controller may cause a ripple image to be displayed as the additional image when a pressing operation of pressing an operation image on the touch panel is accepted, the ripple image being centered on a position in the touch panel at which the pressing operation is accepted. The controller may cause an image indicating a trajectory of a tracing operation in the touch panel to be displayed as the additional image when the tracing operation of tracing an operation image on the touch panel is accepted. As a result, when the pressing operation of pressing an operation image on the touch panel is accepted, it is possible to display the ripple image which is centered on the position in the touch panel at which the pressing operation is accepted. Moreover, when the tracing operation of tracing an operation image on the touch panel is accepted, it is possible to display an image indicating a trajectory of the tracing operation in the touch panel.

Further, according to the embodiment, the controller may cause the additional image to be erased at a predetermined timing. As a result, the additional image can be erased at the predetermined timing.

Further, according to the embodiment, the controller may determine the predetermined timing based on a delay time occurred in the short-range wireless communication with the other information processing device. As a result, the predetermined timing can be determined based on the delay time occurred in the short-range wireless communication with the other information processing device.

Further, according to the embodiment, the controller may regard a timing of receiving data indicating that the control data is accepted from the other information processing device as the predetermined timing. As a result, the timing of receiving data indicating that the control data is accepted from the other information processing device can be regarded as the predetermined timing.

Further, according to the embodiment, the controller may regard a timing of receiving image data corresponding to image data identification information from the other information processing device or a timing of displaying an image based on the image data as the predetermined timing, the image data identification information being included in data indicating that the other information processing device accepts the control data. As a result, the timing of receiving image data corresponding to image data identification information included in data indicating that the control data is accepted from the other information processing device or the timing of displaying an image based on the image data can be regarded as the predetermined timing.

Further, according to the embodiment, the information processing device may further include a posture detection unit configured to detect a posture of the information processing device. The user operation may be an operation performed by changing the posture of the information processing device. The controller may cause the notification information for issuing a notification that the user operation based on the change is accepted to be output when the posture of the information processing device is changed. As a result, when the posture of the information processing device is changed, it is possible to display the notification information used to issue a notification that the user operation based on the change is accepted.

Further, according to the embodiment, when the posture of the information processing device is changed, the controller may cause the notification information to be output by superimposing an additional image visually indicating the change on an image displayed on the display unit. As a result, when the posture of the information processing device is changed, the additional image visually indicating the change can be displayed by superimposing it on an image displayed on the display unit.

Further, according to a second embodiment of the present technology, there is provided a communication system, an information processing method of the same and a program for causing a computer to perform the method, the communication system including a first information processing device, and a second information processing device. The first information processing device causes an image based on image data received from the second information processing device using short-range wireless communication to be displayed on a first display unit, and transmits control data corresponding to a user operation related to the image to the second information processing device when the user operation is accepted. The second information processing device transmits image data that is used to display the image on the first information processing device using the short-range wireless communication while causing an image identical with the image to be displayed on a second display unit and transmitting data indicating that the control data is received to the first information processing device when the control data is received from the first information processing device. At least one of a first operation and a second operation is performed, the first operation allowing the first information processing device to superimpose an additional image indicating that the user operation is accepted on the image displayed on the first display unit, the second operation allowing the second information processing device to superimpose an additional image indicating that the control data is accepted on the image displayed on the second display unit. As a result, it is possible to perform at least one of the first operation allowing the first information processing device to cause an additional image indicating that the user operation is accepted to be displayed by superimposing the additional image on the image displayed on the first display unit and the second operation allowing the second information processing device to cause an additional image indicating that the control data is accepted to be displayed by superimposing the additional image on the image displayed on the second display unit.

According to one or more of embodiments of the present technology, it is possible for the user to easily recognize the acceptance condition of the user operation.

BRIEF DESCRIPTION OF THE DRAWINGS

FIG. 6 is a diagram illustrating a display transition example of the display unit 350 in a case where the user operates the information processing device 300 according to the first embodiment of the present technology;

FIG. 7 is a diagram illustrating a display transition example of the display unit 350 in a case where the user operates the information processing device 300 according to the first embodiment of the present technology;

FIG. 9 is a diagram illustrating a display transition example of the display unit 350 in a case where the user operates the information processing device 300 according to the first embodiment of the present technology;

DETAILED DESCRIPTION OF THE EMBODIMENT(S)

Figure 1:
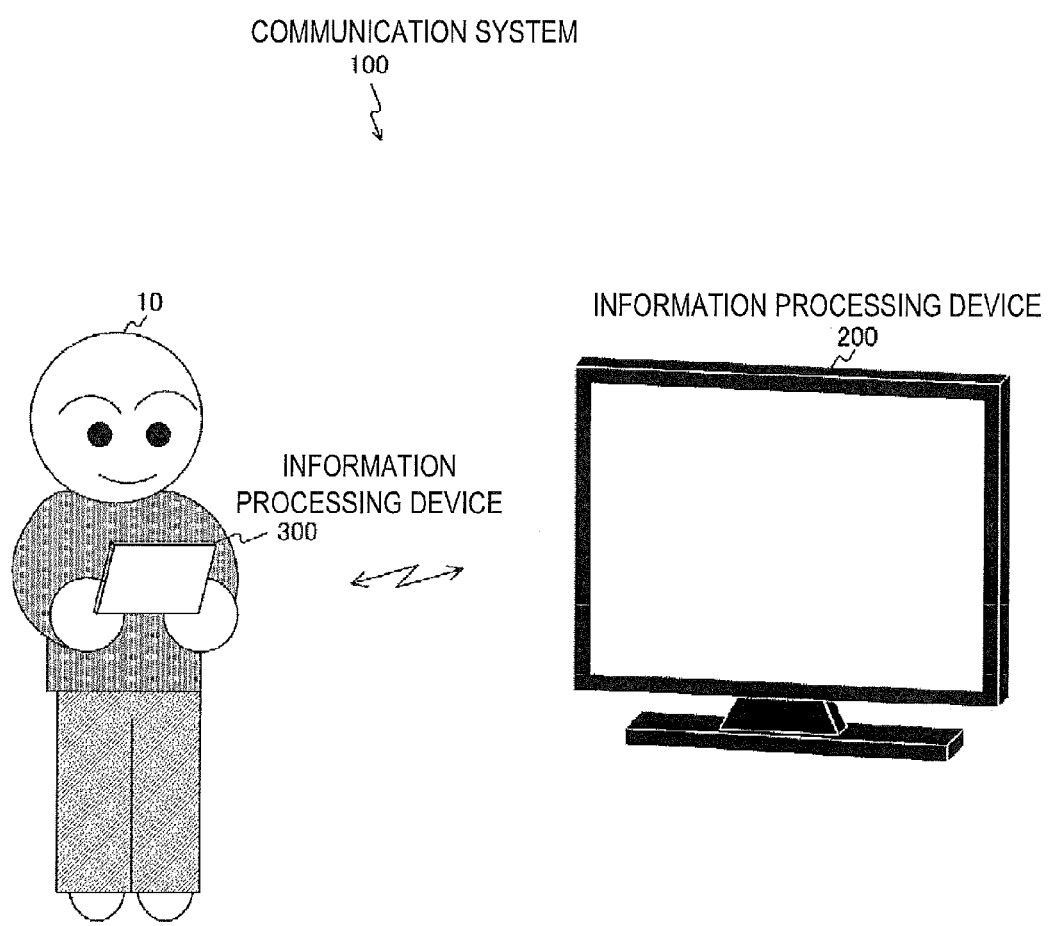
FIG. 1 is a diagram illustrating an exemplary configuration of a communication system 100 according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments for implementing the present technology (hereinafter simply referred to as "embodiment") will be described below. In addition, the description will be made in the following order.

1. First Embodiment (display control: an example of displaying additional image when user operation is accepted and erasing additional image based on delay time)
2. Second Embodiment (display control: an example of displaying additional image when user operation is accepted and erasing additional image based on data from transmission-side information processing device)
3. Third Embodiment (display control: an example of displaying additional image on both information processing devices of reception and transmission sides)
4. Modified Example
5. Modified Example 1. First Embodiment

[Exemplary Configuration of Communication System]

FIG. 1 is a diagram illustrating an exemplary configuration of a communication system 100 according to a first embodiment of the present technology. In FIG. 1, there is illustrated an example of a system configuration when two information processing devices (information processing devices 200 and 300) are directly connected to each other in a wireless manner.

The communication system 100 includes the information processing devices 200 and 300. In addition, the information processing devices 200 and 300 each has a short-range wireless communication function. These information processing devices are, for example, wireless communication devices based on the IEEE (Institute of Electrical and Electronics Engineers) 802.11 standard. Thus, the information processing devices 200 and 300 can exchange various types of information using the short-range wireless communication function.

Here, for example, a wireless LAN (Local Area Network) and Wi-Fi Direct can be used as short-range wireless communication to be used in the communication system 100. In addition, for example, TDLS (Tunneled Direct Link Setup) and an Ad-hoc network can be used as short-range wireless communication to be used in the communication system 100. Additionally, for example, Wi-Fi CERTIFIED Miracast can be used as short-range wireless AV (Audio Visual) transmission communication to be used in the communication system 100. The Wi-Fi CERTIFIED Miracast is a mirroring technology in which audio or video to be played back in one terminal is sent to another terminal and the other terminal outputs the audio or video data as well, by using Wi-Fi Direct or TDLS standard.

Furthermore, as an example, the communication system 100 may be implemented by applying a user interface back channel (UIBC) to Wi-Fi CERTIFIED Miracast. The UIBC is, for example, a protocol used in exchange between Host PC (host computer) and USB (Universal Serial Bus). In the Wi-Fi CERTIFIED Miracast standard, the UIBC is implemented on a TCP IP (Transmission Control Protocol/Internet Protocol). In addition, instead of Wi-Fi CERTIFIED Miracast, VNC (Virtual Network Computing) may be applied to the communication system 100.

Moreover, the information processing device 200, for example, may be a display device (for example, televisions, personal computers) or portable information processing device (for example, cameras, tablet terminals, smart phones) equipped with a wireless communication function. In addition, the information processing device 300, for example, may be a portable information processing device equipped with a wireless communication function (for example, tablet terminals, smart phones).

In FIG. 1, there is illustrated a case where the communication system 100 is used by a user 10 in a state where the information processing device 300 is being held by his hand. As an example, the information processing device 200 can transmit image data using short-range wireless communication, and the information processing device 300 can receive the image data for outputting it. In addition, the user 10 can perform various kinds of operations on the information processing device 300 held in his hand.

[Exemplary Configuration of Information Processing Device]

Figure 2:
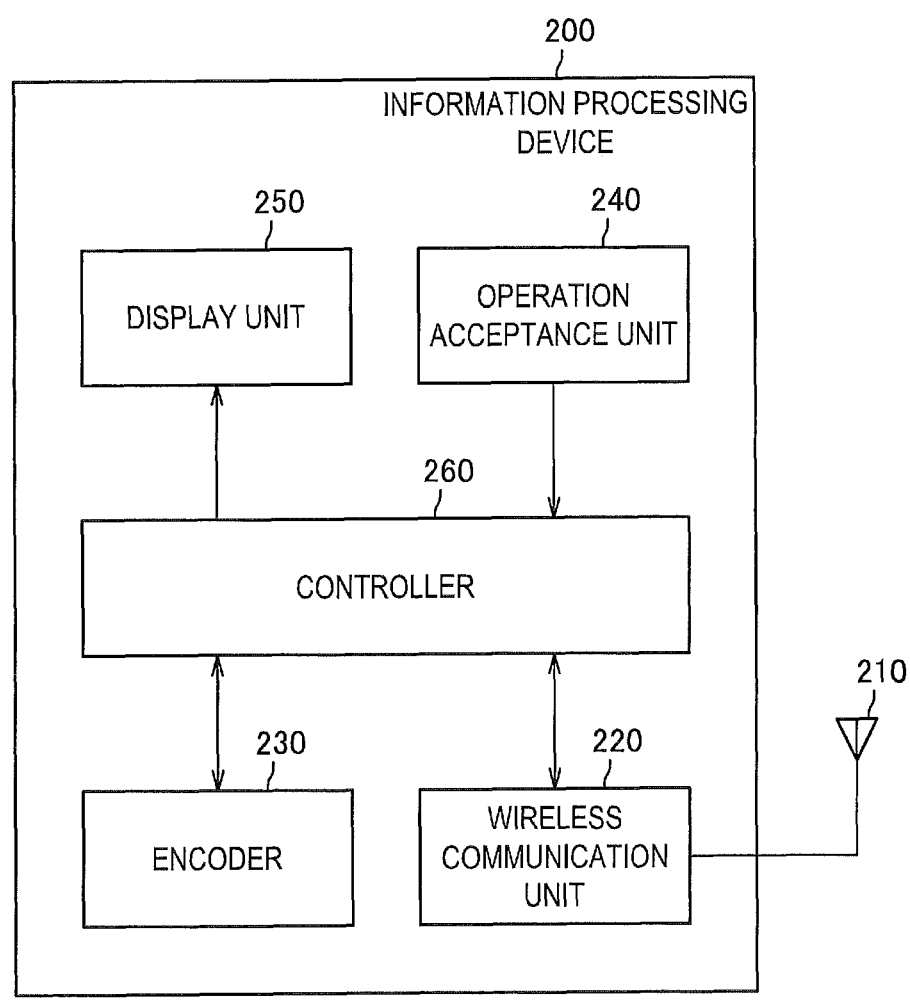
FIG. 2 is a block diagram illustrating an exemplary functional configuration of an information processing device 200 according to the first embodiment of the present technology.

FIG. 2 is a block diagram illustrating an exemplary functional configuration of the information processing device 200 according to the first embodiment of the present technology.

The information processing device 200 includes an antenna 210, a wireless communication unit 220, an encoder 230, an operation acceptance unit 240, a display unit 250, and a controller 260.

The wireless communication unit 220 performs transmission or reception of various types of information (for example, image data) to and from another information processing device (for example, the information processing device 300) via the antenna 210 by using short-range wireless communication. As an example, when a transmission process is performed, the encoder 230 compresses image data (video data) output from the controller 260 and the compressed image data is transmitted from the antenna 210 through the wireless communication unit 220.

The encoder 230 compresses (encodes) image data to be transmitted and outputs the compressed image data to the controller 260. In addition, the encoder 230 may be implemented by executing an encoding process in software or may be implemented by executing an encoding process in hardware. Additionally, the image data to be a transmission object may be transmitted as raw data without being encoded by the encoder 230.

The operation acceptance unit 240 accepts an operation input performed by the user and outputs operation information corresponding to the accepted operation input to the controller 260.

The display unit 250 displays various types of information (images, games, etc.) under the control of the controller 260. In addition, the display unit 250, for example, may be a display panel such as organic EL (Electro Luminescence) panel, LCD (Liquid Crystal Display) panel, or the like. Additionally, the operation acceptance unit 240 and the display unit 250 may be integrally configured as a touch panel on which the user can perform an operation input by bring his finger into contact with or in proximate to a display surface.

The controller 260 is configured to control each unit of the information processing device 200. As an example, the controller 260 controls the transmission of image data used to display an image to the information processing device 300. In addition, for example, when control data corresponding to a user operation accepted in the information processing device 300 is received from the information processing device 300, the controller 260 performs a process based on the received control data.

[Exemplary Configuration of Information Processing Device]

Figure 3:
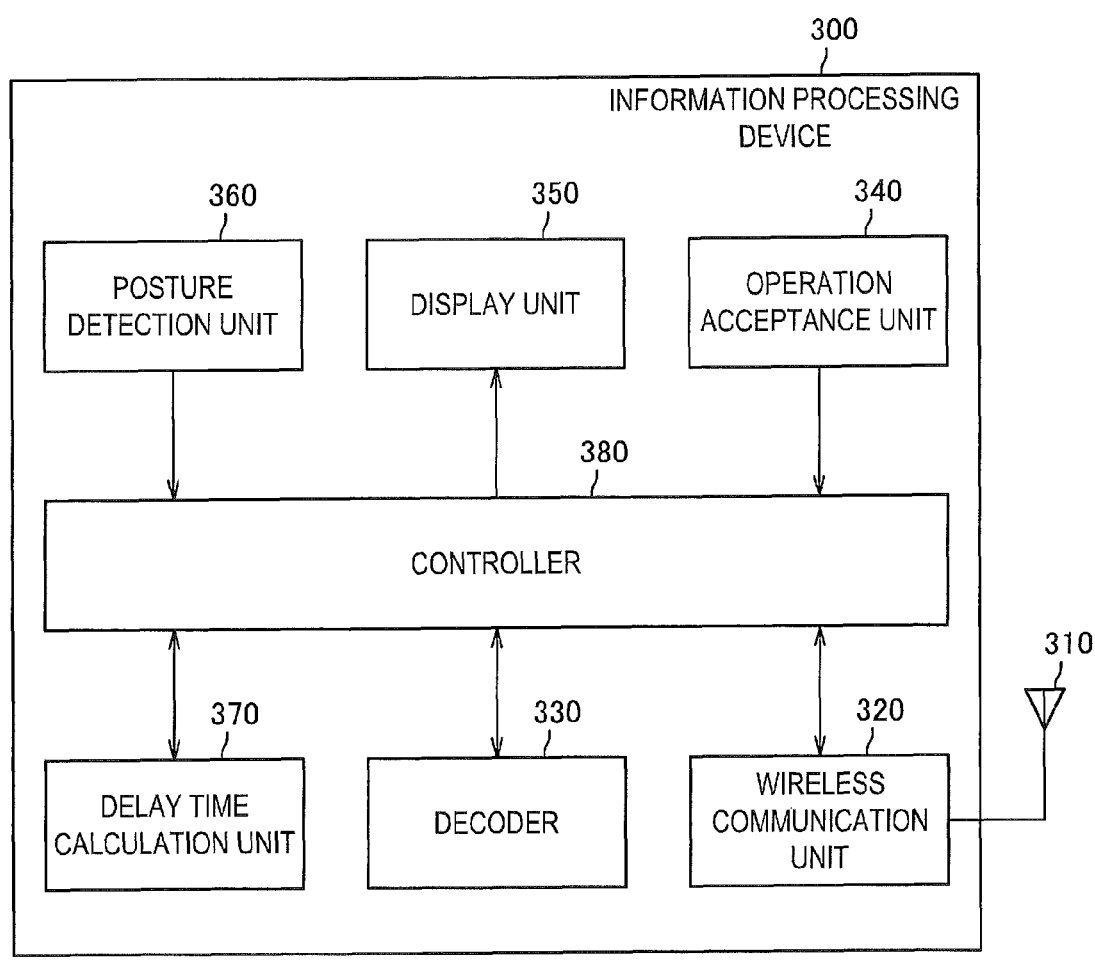
FIG. 3 is a block diagram illustrating an exemplary functional configuration of an information processing device 300 according to the first embodiment of the present technology.

FIG. 3 is a block diagram illustrating an exemplary functional configuration of the information processing device 300 according to the first embodiment of the present technology.

The information processing device 300 includes an antenna 310, a wireless communication unit 320, a decoder 330, an operation acceptance unit 340, a display unit 350, a posture detection unit 360, a delay time calculation unit 370, and a controller 380.

The wireless communication unit 320 performs transmission or reception of various types of information (for example, image data) to and from another information processing device (for example, the information processing device 200) via the antenna 310 by using short-range wireless communication. As an example, when a reception process is performed, the decoder 330 decodes image data received through the wireless communication unit 320 by the antenna 310, and the decoded image data is supplied to the controller 380. The controller 380 then causes the display unit 350 to display an image corresponding to the decoded image data.

The decoder 330 decodes image data output from the information processing device 200 and outputs the decoded image data to the controller 380. In addition, the decoder 330 may be implemented by executing an encoding process in software or may be implemented by executing an encoding process in hardware. Additionally, if image data transmitted from the information processing device 200 is raw data, the raw data may be used without being decoded by the decoder 330.

The operation acceptance unit 340 accepts an operation input performed by the user and outputs operation information corresponding to the accepted operation input to the controller 380. As an example, when a display screen based on image data received from the information processing device 200 using short-range wireless communication is displayed on the display unit 350, the operation acceptance unit 340 accepts a user operation related to the display screen. As an example, the operation acceptance unit 340 may be implemented as a touch panel, a keyboard, a mouse.

The display unit 350 is configured to display various types of information (images, games, etc.) under the control of the controller 380. The display unit 350 may display an image (for example, display screens shown FIGS. 4 to 9) based on image data transmitted from the information processing device 200. In addition, the display unit 350 may be a display panel such as organic EL panel, LCD panel, or the like. Additionally, in the embodiment of the present technology, there is illustrated an example in which the operation acceptance unit 340 and the display unit 350 are integrally configured as a touch panel on which the user can perform an operation input by bring his finger into contact with or in proximate to a display surface.

The posture detection unit 360 detects the change in posture of the information processing device 300 by detecting acceleration, motion, tilt, or the like of the information processing device 300 and outputs posture information related to the detected change in posture to the controller 380. It is preferable that a sensor capable of detecting the rotation angle of three axes (for example, X, Y, and Z axes) in the information processing device 300 is used as the posture detection unit 360. For example, the posture detection unit 360 may be an acceleration sensor capable of detecting the direction of acceleration, a tilt sensor for detecting tilt of a device, and an angular velocity sensor or gyro sensor capable of detecting rotational movement.

The delay time calculation unit 370 is configured to calculate a delay time in short-range wireless communication generated between the information processing device 200 and the information processing device 300. The delay time calculation unit 370 outputs the calculated delay time to the controller 380. In addition, a method of calculating the delay time will be described in detail with reference to FIG. 10.

The controller 380 controls each unit of the information processing device 300. As an example, the controller 380 controls the display unit 350 to display a display screen based on image data received from the information processing device 200. In this case, when accepting a user operation, the controller 380 controls the display unit 350 to display notification information for issuing a notification that a user operation is accepted. As an example of the notification information, an additional image which indicates that the user operation is accepted (for example, a ripple image 402 shown in b of FIG. 4) is displayed by superimposing the additional image on a display screen (a display screen based on image data received from the information processing device 200) displayed on the display unit 350. Additionally, when a user operation is accepted, the controller 380 controls to transmit control data corresponding to the user operation to the information processing device 200.

Furthermore, for example, the controller 380 causes the additional image displayed on the display unit 350 to be erased at a predetermined timing. As an example, the controller 380 can determine the predetermined timing based on a delay time calculated by the delay time calculation unit 370.

[Exemplary Display of Reception-side Information Processing Device]

FIGS. 4 to 9 are diagrams illustrating a display transition example of the display unit 350 in a case where the user operates the information processing device 300 according to the first embodiment of the present technology.

[Exemplary Display when performing Pressing Operation]

Figure 4:
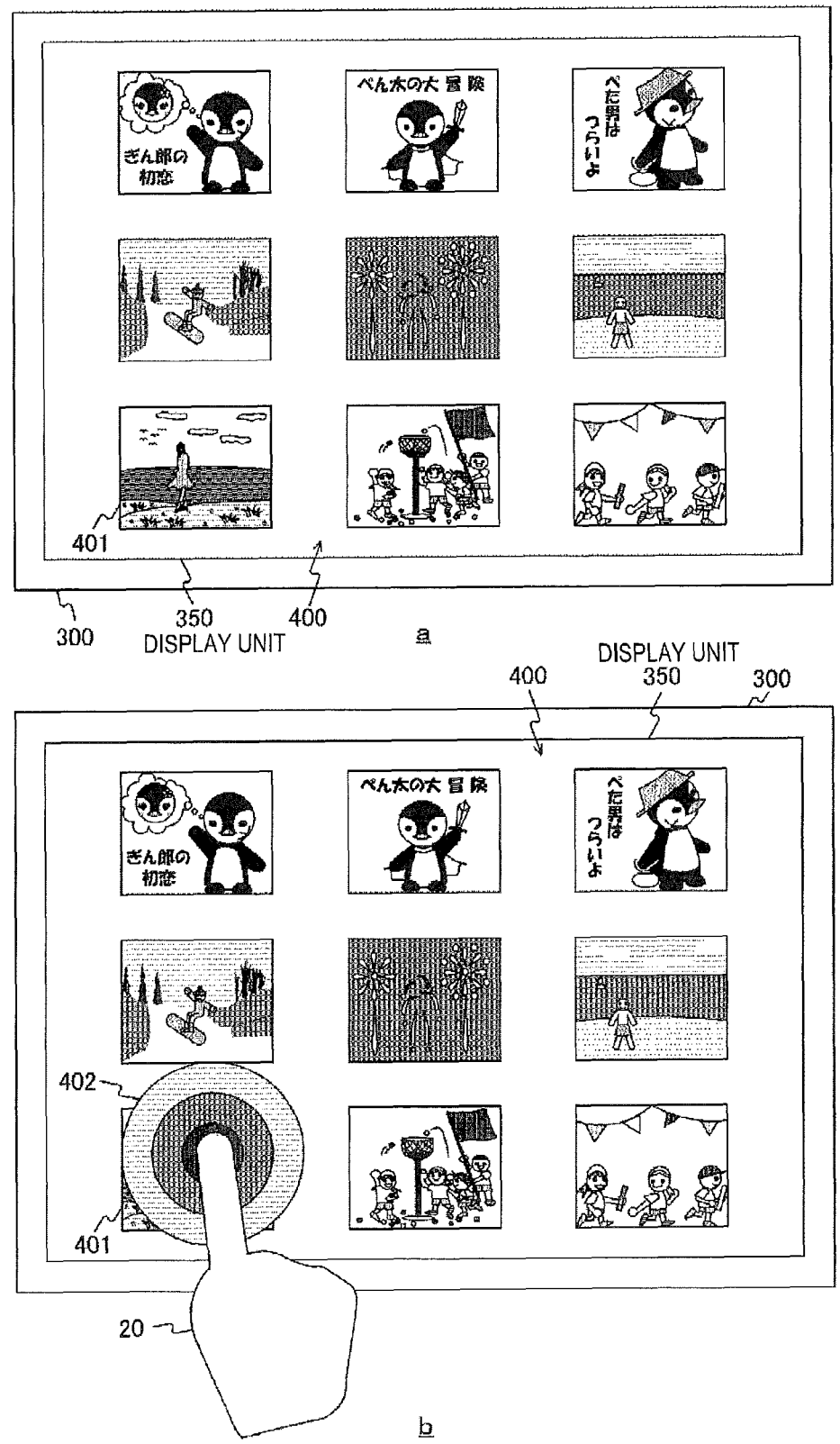
FIG. 4 is a diagram illustrating a display transition example of a display unit 350 in a case where the user operates an information processing device 300 according to the first embodiment of the present technology.

In a of FIG. 4, there is illustrated an exemplary display in a case where a content list screen 400 is displayed on the display unit 350 of the information processing device 300. The content list screen 400 is displayed based on image data transmitted from the information processing device 200. As an example, a representative image that represents content (for example, moving image content or still image content) is displayed on the content list screen 400 for each content. The user can use desired content by performing an operation (for example, a touch operation by the user) of selecting a representative image corresponding to the desired content in the content list screen 400.

Here, in a case where only a display screen based on image data transmitted from the information processing device 200 is displayed on the display unit 350, it is assumed that the user performs an operation input (user operation) while viewing this display screen. In this case, for example, when a user operation is performed on the content list screen 400, control data corresponding to the user operation is transmitted from the information processing device 300 to the information processing device 200. The information processing device 200, when receiving the control data, performs a process corresponding to the control data and then transmits image data used to display a display screen after performing the process (a display screen in which the control data is reflected) to the information processing device 300.

In this way, in a case where a user operation is performed in the content list screen 400, after the exchange of information between the information processing device 300 and the information processing device 200 is performed, the display screen in which the control data is reflected is displayed. For this reason, it may take a longer time until the display screen reflecting the user operation is displayed. In such a case, even though a user operation is performed in the content list screen 400, it may not be possible for the user to quickly recognize whether the user operation is properly accepted or not, and thus it becomes difficult to determine whether the user operation is actually accepted or not. In this time, the erroneous operation, such as determining that the user operation is not accepted properly and thus performing again an operation input, is more likely to occur.

Therefore, in the first embodiment of the present technology, when a user operation is performed on the display screen that is displayed on the display unit 350, an additional image indicating that the user operation is properly accepted (for example, a ripple image 402 shown in b of FIG. 4) is immediately displayed by superimposing it on the display screen. This makes it possible to quickly notify the user that the user operation is accepted.

In b of FIG. 4, there is illustrated an exemplary display immediately after a user operation is performed on the content list screen 400. In this example, there is illustrated an exemplary display in a case where a user operation for selecting a representative image 401 is performed on the content list screen 400.

As illustrated in b of FIG. 4, in the content list screen 400, in a case where a user operation for selecting the representative image 401 (for example, a pressing operation) is performed, the controller 380 causes a ripple image (additional image) 402 to be displayed around the selected representative image 401. The controller 380 then transmits control data (including a pressed position and time) indicating that the representative image 401 is selected to the transmission-side information processing device 200. In this way, the ripple image 402 indicating that the user operation for selecting the representative image 401 is properly accepted is displayed immediately after the user operation is performed, and thus it is possible for the user to recognize easily and quickly that the user's own operation is accepted.

Here, in b of FIG. 4, there is illustrated an example where the ripple image 402 of a wave pattern on which a plurality of colors are imparted is displayed as an additional image. However, a semi-transparent ripple image may be displayed as an additional image. In addition, an image of other shapes may be displayed as an additional image.

Moreover, in b of FIG. 4, there is illustrated an example of performing a pressing operation as a user operation. However, even when other pressing operations (for example, long press, double click) are performed, the ripple image may be similarly displayed as an additional image. In this case, the color or shape of the ripple image may be changed according to the type of user operations. In addition, for example, when a long press operation is performed as a user operation, the color or size may be changed according to the length of a pressing time. Additionally, for other pressing operations, an image of other shape may be displayed as an additional image.

Furthermore, an additional image may be similarly displayed even when performing each operation (for example, tracing operation, enlargement/reduction operation) other than a pressing operation. These display examples will be illustrated in FIGS. 5 to 7.

[Exemplary Display when performing Tracing Operation]

Figure 5:
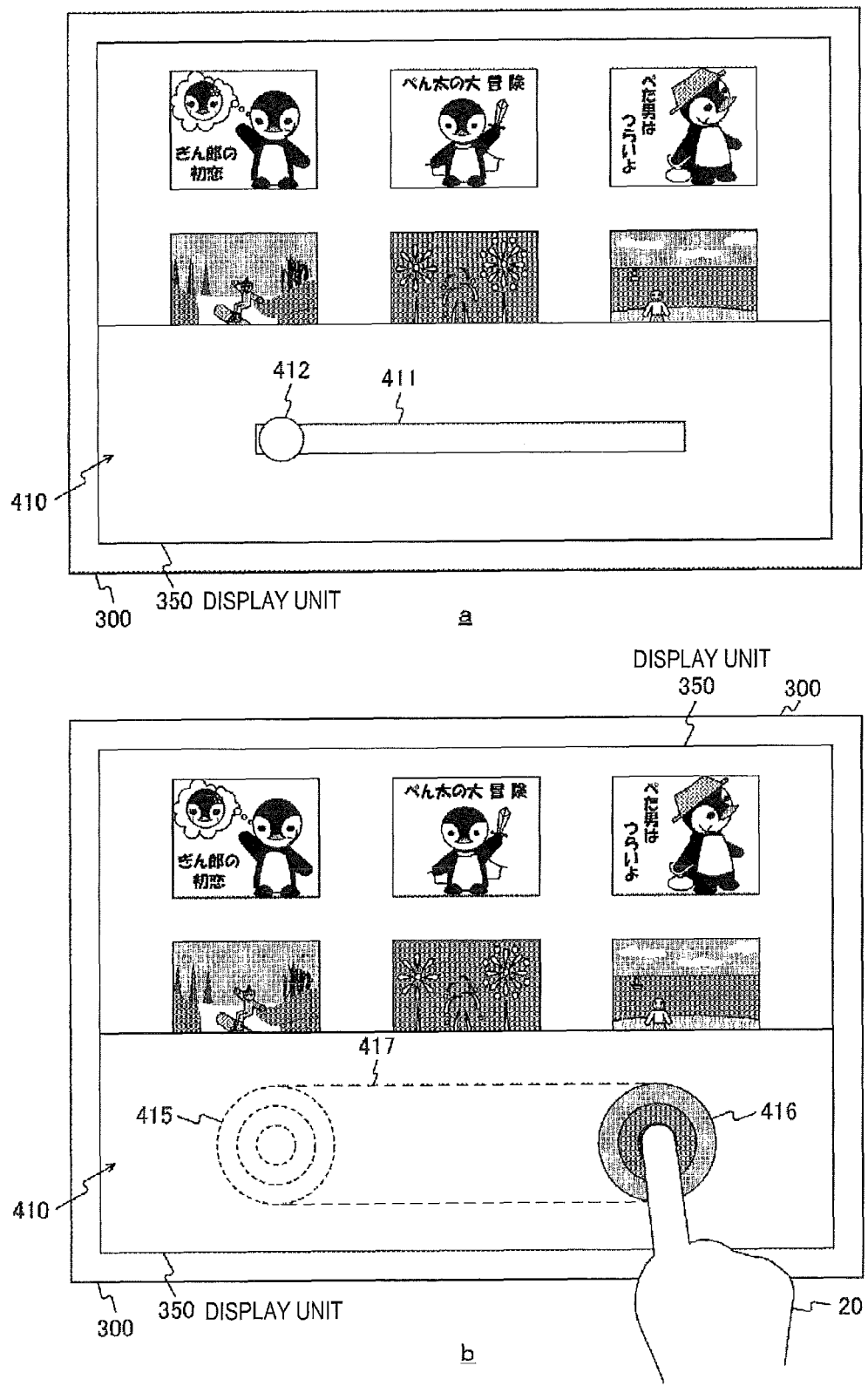
FIG. 5 is a diagram illustrating a display transition example of the display unit 350 in a case where the user operates the information processing device 300 according to the first embodiment of the present technology.

In a of FIG. 5, there is illustrated an exemplary display in a case where an operation screen 410 is displayed on the content list screen 400 shown in FIG. 4. The operation screen 410 is displayed based on image data transmitted from the information processing device 200, for example, according to a predetermined timing or a user operation.

An operation region image 411 and an operation indicator 412 are displayed on the operation screen 410. The operation region image 411 is used to perform settings (for example, a display modification setting) of each process related to the content list screen 400 by moving the operation indicator 412.

The operation indicator 412 can be moved by a touch operation or tracing operation of the user in the operation region image 411. For example, in a state where a portion on which the display indicator 412 is displayed in the operation region image 411 is touched with the user's finger, the user moves his finger to a desired position in the operation region image 411 and thus a moving operation (scroll operation) of the operation indicator 412 can be performed. In addition, the user can move the operation indicator 412 to the position where his finger is touched by performing the operation (touch operation) in which the user touches the desired position in the operation region screen 411 with his finger.

In b of FIG. 5, there is illustrated an exemplary display of the operation screen 410 immediately after performing the user operation. In this example, there is illustrated an exemplary display in a case where a user operation for moving the operation indicator 412 from the left to the right is performed in the operation region image 411.

As illustrated in b of FIG. 5, when a user operation (for example, tracing operation) for moving the operation indicator 412 from the left to the right is performed in the operation region image 411, the controller 380 allows ripple images (additional images) 415 and 416 indicating the first and last positions, respectively, to be displayed. In addition, the controller 380 causes a trajectory image (additional image) 417 indicating a trajectory of the movement to be displayed. The controller 380 transmits control data to the transmission-side information processing device 200. This control data indicates that the tracing operation for moving the operation indicator 412 from the left to the right is performed (including a touched position and a trajectory thereof). In this way, immediately after a user operation for moving the operation indicator 412 from the left to the right is performed, the additional images (the ripple images 415 and 416, and the trajectory image 417) indicating that the user operation is properly accepted are displayed. This makes it possible for the user to recognize easily and quickly that the user's own operation is accepted.

In a similar way as b of FIG. 4, instead of each additional image shown in b of FIG. 5, images of other display forms may be displayed as an additional image.

[Exemplary Display when performing Reduction Operation]

In a of FIG. 6, there is illustrated an exemplary display in a case where a content display screen 420 is displayed. The content display screen 420 is the display screen (for example, a screen on which moving or still images are played back) which is displayed after performing the selection operation of the representative image 401 shown in FIG. 4. The content display screen 420 is displayed based on image data transmitted from the information processing device 200.

Here, as shown by arrows 421 and 422, it is assumed that a user operation for reducing an image displayed on the content display screen 420 (for example, an operation in which an image is pinched with two fingers of the hand 20 (pinch)) is performed. In this case, as illustrated in b of FIG. 6, arrow images (additional images) 425 and 426 according to the user operation are displayed.

In b of FIG. 6, there is illustrated an exemplary display of the content display screen 420 immediately after performing the user operation. In this example, there is illustrated an exemplary display in a case where the user operation shown in a of FIG. 6 is performed. In addition, the hand 20 is omitted in b of FIG. 6, for simplicity and clarity of illustration.

As illustrated in b of FIG. 6, when a user operation for reducing an image displayed on the content display screen 420 is performed, the controller 380 causes the arrow images (additional images) 425 and 426 which respectively indicate the first and last positions of the image to be displayed. The controller 380 transmits control data indicating that a user operation for reducing an image displayed on the content display screen 420 (including two touched positions and trajectory thereof) is performed to the transmission-side information processing device 200.

Here, immediately after a user operation is performed on the content display screen 420, image data in which the user operation is reflected has not been transmitted from the information processing device 200. Thus, as illustrated in b of FIG. 6, the arrow images (additional images) 425 and 426 are displayed on the display screen when the user operation is performed. In other words, the arrow images (additional images) 425 and 426 are displayed in a state before performing the reduction process of an image corresponding to the user operation. After that, when image data in which the user operation is reflected is transmitted from the information processing device 200, a display screen on which a reduction process corresponding to the user operation is performed is displayed.

In this way, immediately after performing a user operation for reducing an image displayed on the content display screen 420, the arrow images (additional images) 425 and 426 indicating that the user operation is properly accepted are displayed. Thus, it is possible for the user to recognize easily and quickly that the user's own operation is accepted.

[Exemplary Display when performing Enlargement Operation]

In a of FIG. 7, there is illustrated an exemplary display in a case where the content display screen 420 is displayed. In b of FIG. 7, there is illustrated an exemplary display immediately after performing a user operation for enlarging an image displayed on the content display screen 420.

Furthermore, in the example illustrated in FIG. 7, an enlargement operation is performed instead of performing the reduction operation in the example illustrated in FIG. 6, and thus detailed explanation thereof is omitted. In other words, the example of FIG. 7 illustrates a case where a user operation for enlarging an image displayed on the content display screen 420 (for example, an operation in which an image is pinched with two fingers of the hand 20 (pinch)) is performed as illustrated by arrows 431 and 432. In this case, as illustrated in b of FIG. 7, arrow images (additional images) 435 and 436 are displayed according to the user operation.

In this way, when a contact operation (or a proximity operation) is accepted on a display surface (a touch panel) of the display unit 350, the controller 380 causes an additional image to be displayed by using a position in the display surface in which the contact operation (or a proximity operation) is accepted as a reference. For example, when a pressing operation that presses the representative image (operation image) 401 is accepted as illustrated in b of FIG. 4, the controller 380 causes the ripple image 402 centered on a position in the display surface in which the pressing operation is accepted to be displayed as an additional image. In addition, as an example, when an operation of tracing an operation image in a display surface is accepted as illustrated in FIGS. 5 to 7, the controller 380 causes an image indicating a trajectory of the tracing operation in the display surface to be displayed as an additional image. The image indicating the trajectory is, for example, the ripple images 415, 416 and trajectory image 417 shown in b of FIG. 5, the arrow images 425 and 426 shown in b of FIG. 6, and the arrow images 435 and 436 shown in b of FIG. 7.

[Exemplary Display when performing Operation by tilting Information Processing Device]

Figure 8:
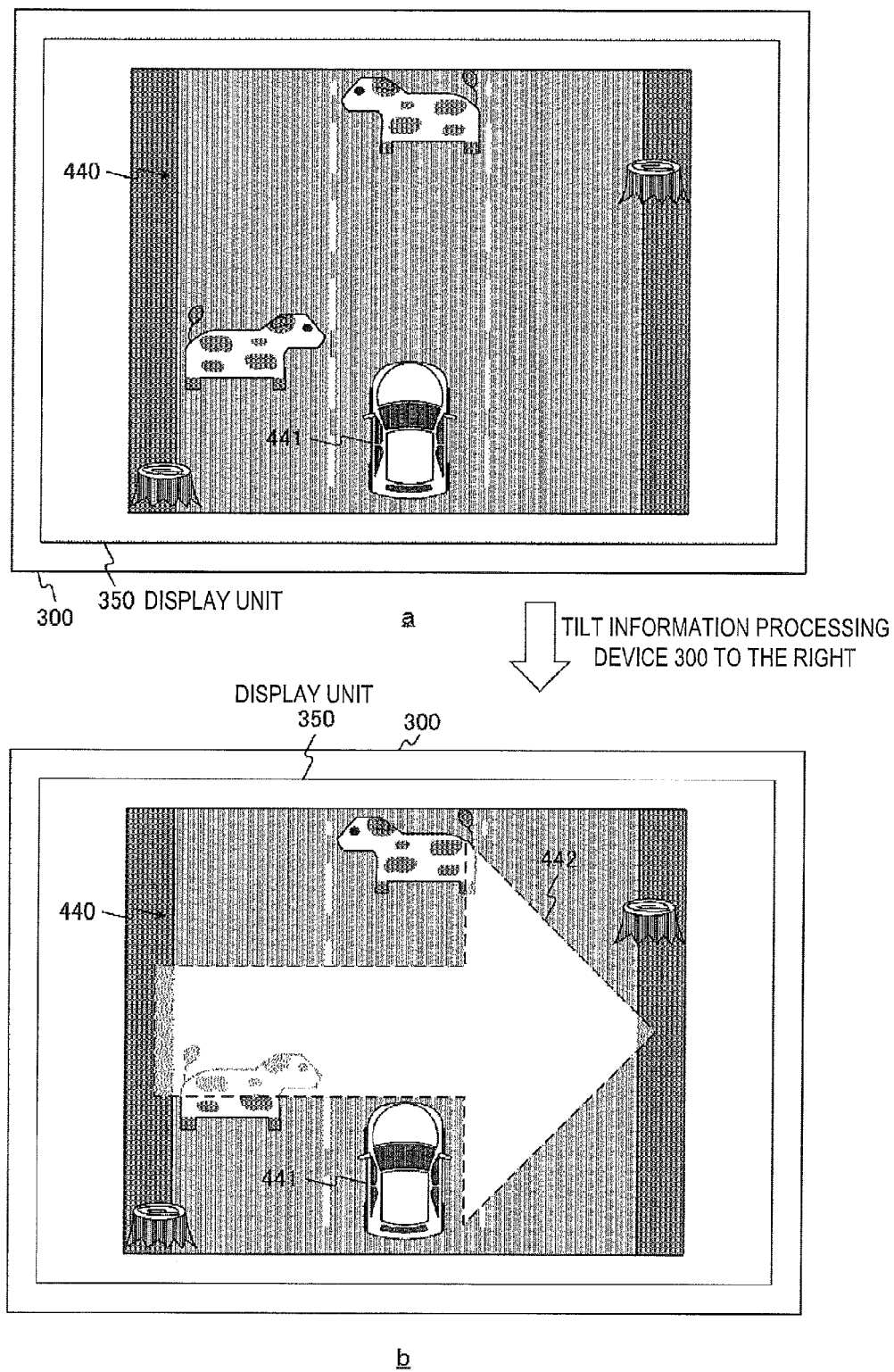
FIG. 8 is a diagram illustrating a display transition example of the display unit 350 in a case where the user operates the information processing device 300 according to the first embodiment of the present technology.

In a of FIG. 8, there is illustrated an exemplary display in a case where a content display screen 440 is displayed. The content display screen 440 is, for example, the display screen displayed based on a user operation. The content display screen 440 is displayed based on image data transmitted from the information processing device 200. The content display screen 440 is, for example, a display screen for performing a game of operating a car 441 while avoiding an obstacle (cows, stumps) on the road. As an example, it is assumed that the car 441 can be turned to the left by tilting the information processing device 300 to the left and the car 441 can turned to the right by tilting the information processing device 300 to the right.

Here, it is assumed that an operation of tilting the information processing device 300 to the right (operation of turning the car 441 to the right) is performed. In this case, as illustrated in b of FIG. 8, an arrow image (additional image) 442 corresponding to the user operation is displayed.

In b of FIG. 8, there is illustrated an exemplary display immediately after performing a user operation in the content display screen 440. In this example, there is illustrated an exemplary display in a case where the operation of tilting the information processing device 300 to the right (the operation of turning the car 441 to the right) is performed. In addition, a hand of the user is omitted in FIG. 8, for simplicity and clarity of illustration.

As illustrated in b of FIG. 8, when the operation of tilting the information processing device 300 to the right (the operation of turning the car 441 to the right) is performed, the controller 380 can detect the operation based on posture information (information related to the change in posture) output from the posture detection unit 360. In this way, when the operation is detected, the controller 380 causes the arrow image (additional image) 442 indicating the tilting direction to be displayed. The controller 380 then transmits control data (including the tilting direction and angle thereof) indicating that a user operation of tilting the information processing device 300 to the right (the operation of turning the car 441 to the right) is performed to the transmission-side information processing device 200.

Here, immediately after performing a user operation in the content display screen 440, image data in which the user operation is reflected has not been transmitted from the information processing device 200. Thus, as illustrated in b of FIG. 8, the arrow image (additional image) 442 is displayed on an image when the user operation is performed. In other words, the arrow image (additional image) 442 is displayed in a state before the car 441 is moved according to the user operation. After that, when the image data in which the user operation is reflected is transmitted from the information processing device 200, a display screen on which the car 441 is moved according to the user operation is displayed.

In this way, immediately after performing the operation of tilting the information processing device 300 to the right (the operation of turning the car 441 to the right), the arrow image (additional image) 442 indicating that the user operation is properly accepted is displayed. This makes it possible for the user to recognize easily and quickly that the user's own operation is accepted.

[Exemplary Display when performing operation by rotating Information Processing Device]

In a of FIG. 9, there is illustrated an exemplary display in a case where a content display screen 450 is displayed. The content display screen 450 is, for example, a display screen displayed based on a user operation and is displayed based on image data transmitted from the information processing device 200. The content display screen 450 is, for example, a display screen for playing back an animation. In addition, the information processing device 300 is rotated by an angle of ninety degrees by using an axis perpendicular to a display surface of the display unit 350 as a rotation axis, and thus it is assumed that it is possible to change between the longitudinal state and lateral state of the display unit 350.

Here, as shown by an arrow 451, it is assumed that an operation of rotating the information processing device 300 in the clockwise (CW) direction by an angle of ninety degrees by using an axis perpendicular to a display surface of the display unit 350 as a rotation axis is performed. In this case, as illustrated in b of FIG. 9, an arrow image (additional image) 452 is displayed according to a user operation.

In b of FIG. 9, there is illustrated an exemplary display immediately after performing a user operation in the content display screen 450. In this example, there is illustrated an exemplary display in a case where an operation of rotating the information processing device 300 in the CW direction by an angle of ninety degrees is performed. In addition, a hand of the user is omitted in FIG. 9 for simplicity and clarity of illustration.

As illustrated in b of FIG. 9, when an operation of rotating the information processing device 300 in the CW direction by an angle of ninety degrees is performed, the controller 380 can detect the operation based on posture information (information related to the change in posture) output from the posture detection unit 360. In this way, when the operation is detected, the controller 380 causes the arrow image (an additional image) 452 indicating the direction of the rotation to be displayed. The controller 380 then transmits control data to the transmission-side information processing device 200. This control data (including the rotation direction and angle thereof) indicates that the operation of rotating the information processing device 300 in the CW direction by an angle of ninety degrees is performed.

Here, immediately after performing a user operation in the content display screen 450, image data in which the user operation is reflected has not been transmitted from the information processing device 200. Thus, as illustrated in b of FIG. 9, the arrow image (additional image) 452 is displayed on the image when the user operation is performed. In other words, the arrow image (additional image) 452 is displayed in a state before the image is rotated according to the user operation. After that, when the image data in which the user operation is reflected is transmitted from the information processing device 200, a display screen on which the image is rotated according to the user operation is displayed.

In this way, immediately after performing the operation of rotating the information processing device 300 in the CW direction by an angle of ninety degrees, the additional image 452 indicating that the user operation is properly accepted is displayed. This makes it possible for the user to recognize easily and quickly that the user's own operation is accepted.

Thus, when a posture of the information processing device 300 is changed, the controller 380 performs the control of outputting notification information which is used to issue a notification that a user operation based on the change (an operation performed by changing a posture of the information processing device 300) is accepted. In this case, as an example, the controller 380 can output the notification information by causing an additional image (the arrow image 442 shown in FIG. 8, and the arrow image 452 shown in FIG. 9) that visually represents the change to be displayed by superimposing the additional image on the image displayed on the display unit 350.

In a similar way to b of FIG. 4 and b of FIG. 5, instead of each additional image shown in b of FIG. 6, b of FIG. 7, b of FIG. 8, and b of FIG. 9, images of other display modes may be displayed as an additional image. For example, the arrow images (additional images) 442 and 452 shown in b of FIG. 8 and b of FIG. 9 may be displayed on the entire display screen in a state that the image is thin and blinked.

[Communication Example]

Figure 10:
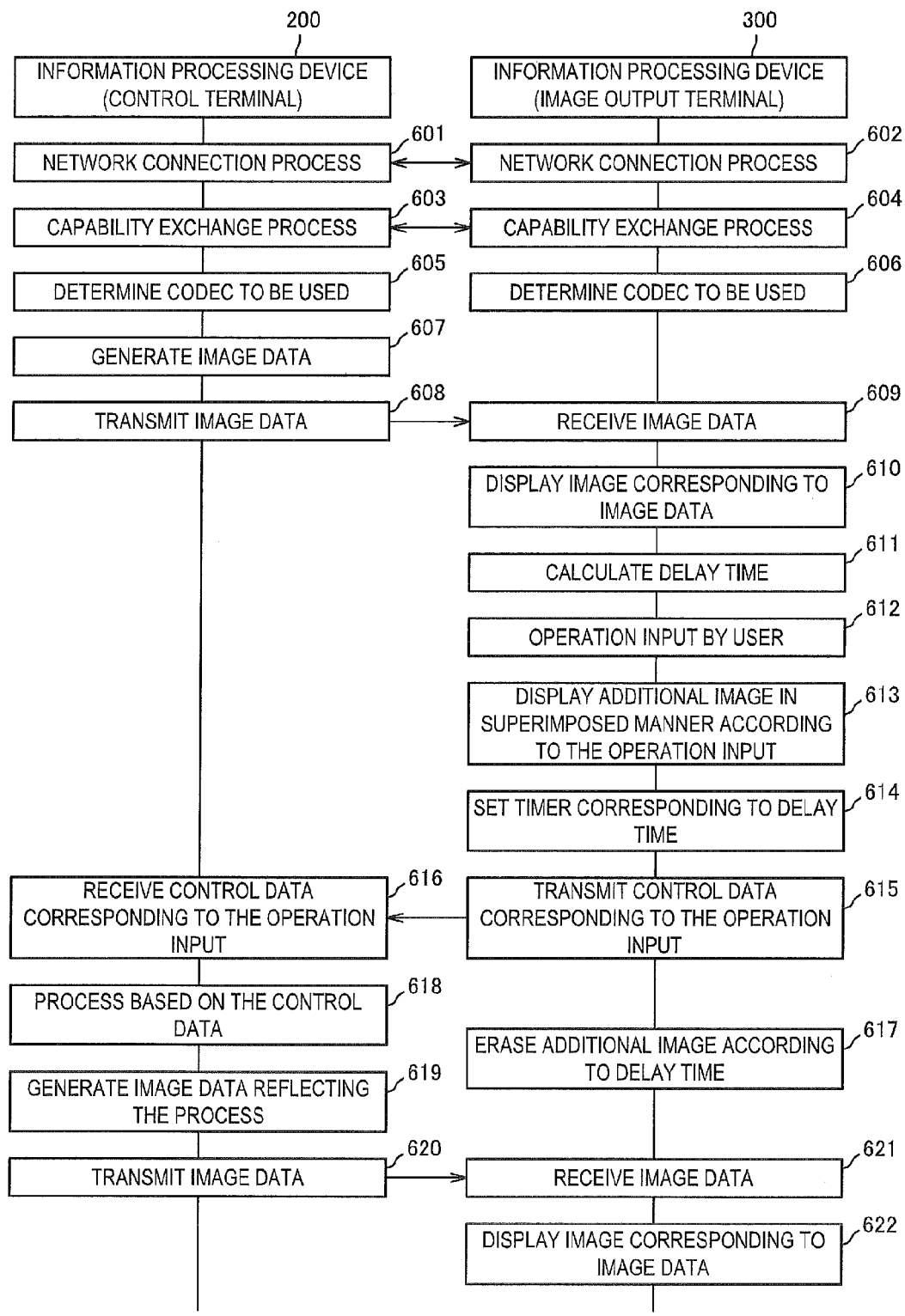
FIG. 10 is a sequence chart illustrating an exemplary communication process to be performed in each device constituting the communication system 100 according to the first embodiment of the present technology.

FIG. 10 is a sequence chart illustrating an exemplary communication process performed in each device constituting the communication system 100 according to the first embodiment of the present technology. Additionally, in this exemplary communication process, there is illustrated a communication process in a case where an operation input by the user is performed in a simplified way.

Initially, a network connection process is performed between the transmission-side information processing device 200 and the reception-side information processing device 300 (601 and 602). In other words, a connection setup is performed between the transmission-side information processing device 200 and the reception-side information processing device 300 (601 and 602).

Subsequently, a capability exchange process of exchanging capabilities in the communication between the transmission-side information processing device 200 and the reception-side information processing device 300 (the process of exchanging, for example, codec information and any other supporting data format information) is performed (603 and 604). In this capability exchange process, for example, each type of information indicating a compression format of image data, size of image used to transmit data, and kind of control data capable of being transmitted is exchanged (603 and 604). As an example, when Wi-Fi CERTIFIED Miracast is used, the above-described data can be exchanged and data format to be transmitted can be determined by using a RTSP (Real Time Streaming Protocol) packet. In addition, a capability to be used may be previously determined between devices, and image data may be transmitted on the previously determined capability. In this case, the capability exchange process may be omitted.

Subsequently, a type of codec to be used (Video Codec) in each of the transmission-side information processing device 200 and the reception-side information processing device 300 is determined (605 and 606). Next, the transmission-side information processing device 200 generates image data corresponding to a display screen (UI screen) which is to be displayed on the reception-side information processing device 300 (607). The transmission-side information processing device 200 then encodes the generated image data and transmits the encoded image data to the reception-side information processing device 300 (608 and 609). As an example, when Wi-Fi CERTIFIED Miracast is used, image data is transmitted by using RTP (Real-time Transport Protocol) data.

When the image data transmitted from the transmission-side information processing device 200 is received (609), the reception-side information processing device 300 decodes the received image data and causes the display unit 350 to display a display screen corresponding to the decoded image data (610). As an example, the content list screen 400 shown in a of FIG. 4 is displayed on the display unit 350.

Subsequently, the delay time calculation unit 370 of the reception-side information processing device 300 calculates an approximate delay time between the transmission-side information processing device 200 and the reception-side information processing device 300 (611). As an example, the delay time is calculated based on an RTT (Round Trip Time) value of packet data exchanged between each device or the size of a buffer included in the reception-side information processing device 300 (611). Here, the RTT value of packet data is the value indicating the time from transmission of a signal to reception of a response. In addition, for example, a RTT value of packet data exchanged between the information processing device 200 and the information processing device 300 in the communication of the capability exchange process (603 and 604) or the communication process of image data (608 and 609) can be used as the RTT value of packet data.

Here, an example of a calculation method of calculating a delay time (estimated delay time) is illustrated below. The delay time can be calculated by using the following Equation (1).

Delay Time=Network Delay+(Packet Arrival Time−Packet Playback Time)  (1)

In the above Equation (1), the network delay can be obtained by using the RTT value of packet data. In addition, the (packet arrival time-packet playback time) can be obtained by using the size of a buffer included in the information processing device 300.

The reception-side information processing device 300 holds the calculated delay time. A value of the delay time may be updated every time when a packet is transmitted or received. In addition, a value of the delay time may be an initially calculated value as a fixed value.

In the following, it is assumed that the user performs an operation input (a user input) in a state where a display screen corresponding to image data transmitted from the transmission-side information processing device 200 is displayed on the display unit 350. When an operation input is performed in this way (612), the reception-side information processing device 300 causes an additional image (effect image) indicating that the operation input is accepted to be displayed by superimposing the additional image on a display screen displayed on the display unit 350 at the time of accepting the operation input (613). In other words, the additional image indicating that the operation input is accepted is displayed by superimposing it on the display screen corresponding to the image data transmitted from the transmission-side information processing device 200 (overlay display). As an example, as illustrated in b of FIG. 4, when a pressing operation is accepted, a wave-like image (the ripple image 402) is displayed overlaid on the display screen. In addition, as illustrated in b of FIG. 5, when a scroll operation is accepted, an additional image (ripple images 415 and 416, trajectory image 417) representing its operation contents is displayed in an overlaid manner.

Subsequently, the reception-side information processing device 300 sets a timer corresponding to the delay time held therein (614). This timer is a timer for measuring the timing of erasing an addition image. In other words, an additional image continues to be displayed until the timer that has been set expires. In the timing when the timer expires, the additional image is erased.

Subsequently, the reception-side information processing device 300 transmits control data (user input data) corresponding to the operation input to the transmission-side information processing device 200 (615 and 616). As an example, the control data corresponding to the operation input is transmitted to the transmission-side information processing device 200 using the UIBC protocol (615 and 616).

In this example, there is illustrated an example where the control data is transmitted (615 and 616) after displaying an additional image (613). However, an addition image may be displayed after transmitting the control data.

Furthermore, in one example, when the delay time held in the reception-side information processing device 300 is smaller than a reference value, an additional image may not be displayed. In other words, only when there is a delay to some extent, an additional image may be displayed and the user may be notified that a user operation is properly accepted.

Moreover, the reception-side information processing device 300 erases an additional image at the timing when the timer that has been set (timer corresponding to a delay time) expires (617). In other words, an additional image is erased after the calculated delay time has elapsed (617).

Here, an image process such as fade-out may be performed for an additional image according to a drawing time of the additional image. As an example, an image process of allowing an additional image to be thinner according to the elapsed time from the timing of displaying an additional image may be performed, and an additional image may be erased when a predetermined time is reached.

When control data transmitted from the reception-side information processing device 300 is received (616), the transmission-side information processing device 200 performs a process based on the received control data (618). In one example, as illustrated in b of FIG. 4, when the pressing operation of the representative image 401 is accepted, a process for allowing the content display screen 420 (shown in FIGS. 6 and 7) corresponding to the representative image 401 to be displayed on the information processing device 300 is performed as a process based on the control data.

Subsequently, the transmission-side information processing device 200 generates image data in which the process based on the control data is reflected (619). Next, the transmission-side information processing device 200 encodes the generated image data and transmits the encoded data to the reception-side information processing device 300 (620 and 621). In addition, the reception-side information processing device 300 decodes the image data and causes the display unit 350 to display a display screen corresponding to the decoded image data (622).

In the following, immediately after performing an operation input by the user, it is assumed that an additional image indicating that the operation input is accepted is not displayed in a superimposed manner. In this case, a result obtained by performing a process based on an operation input by the user will reflected the timing when the reception-side information processing device 300 receives and displays the image data in which the process is reflected. However, the time period ranging from when an operation input by the user is performed to when a result obtained by performing a process based on the operation input is reflected (time period ranging from 612 to 622) is often dependent on a network delay, processing delay, or the like. As the time period is longer, usability (ease of use) is likely to be reduced.

On the other hand, according to the first embodiment of the present technology, an additional image indicating that an operation input by the user is accepted is displayed in a superimposed manner immediately after performing the operation input (612 and 613). Thus, it is possible for the user to be notified easily and quickly that the user operation (a command) is properly accepted at the timing when the operation input by the user is performed.

[Exemplary Operation of Information Processing Device]

Figure 11:
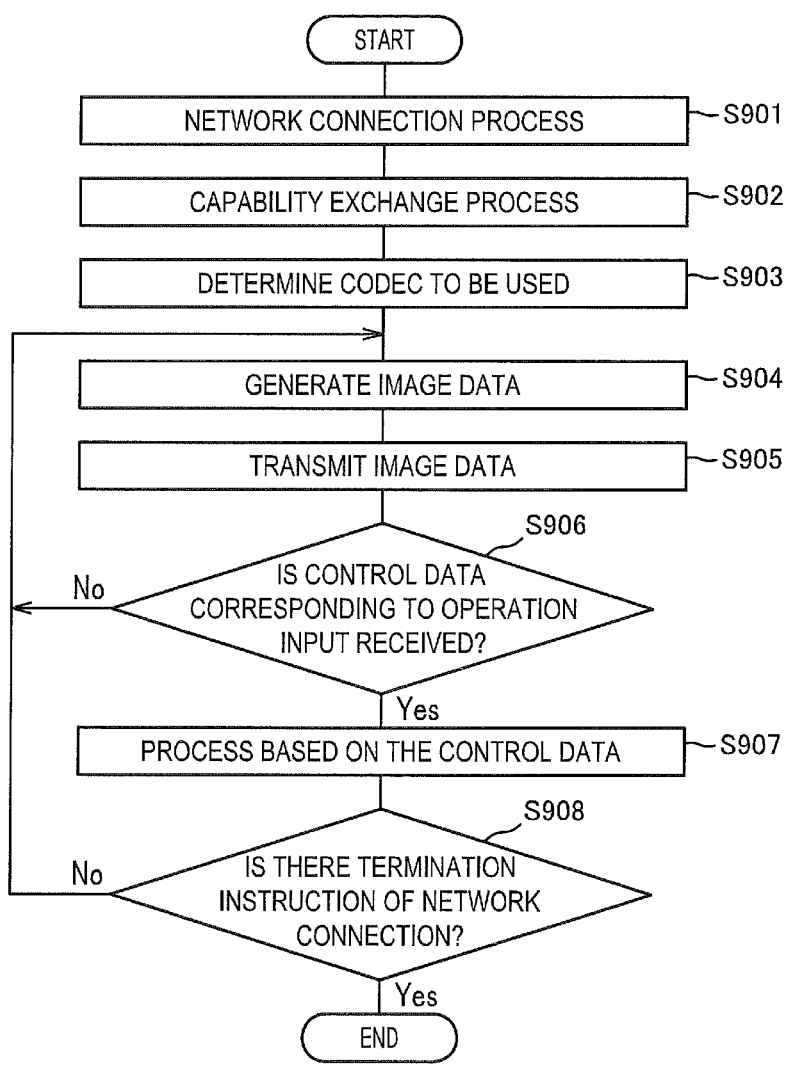
FIG. 11 is a flowchart illustrating an example of a processing procedure of a data communication control process to be performed by the information processing device 200 according to the first embodiment of the present technology.

FIG. 11 is a flowchart illustrating an example of a processing procedure of a data communication control process to be performed by the information processing device 200 according to the first embodiment of the present technology. In addition, in this example, there is illustrated an example of performing short-range wireless communication between the transmission-side information processing device 200 and the reception-side information processing device 300.

Initially, the controller 260 performs a network connection process with the reception-side information processing device 300 (step S901). In other words, a connection is set up between the transmission-side information processing device 200 and the reception-side information processing device 300 (step S901).

Subsequently, the controller 260 performs a capability exchange process of exchanging capabilities in the communication with the reception-side information processing device 300 (step S902). Next, the controller 260 determines a codec (Video Codec) to be used in short-range wireless communication between the transmission-side information processing device 200 and the reception-side information processing device 300 (step S903).

Subsequently, the controller 260 generates image data corresponding to a display screen (UI screen) which is to be displayed on the reception-side information processing device 300 (step S904). Next, the encoder 230 encodes the generated image data, and the controller 260 transmits the encoded image data to the reception-side information processing device 300 (step S905).

Subsequently, the controller 260 determines whether control data corresponding to the operation input is received from the transmission-side information processing device 200 (step S906). If it is determined that the control data corresponding to the operation input is not received (NO in step S906), then the process returns to step S904. On the other hand, If it is determined that the control data corresponding to the operation input is received from the transmission-side information processing device 200 (YES in step S906), then the controller 260 performs a process based on the received control data (step S907).

Subsequently, the controller 260 determines whether an instruction to terminate the network connection is accepted (step S908). If it is determined that the termination instruction is accepted (YES in step S908), then the data communication control process is ended. On the other hand, if it is determined that the termination instruction is not accepted (NO in step S908), then the process returns to step S904. Then, the controller 260 generates image data (the image data in which the process based on the received control data is reflected) corresponding to a display screen (UI screen) to be displayed on the reception-side information processing device 300 (step S904).

[Exemplary Operation of Information Processing Device]

Figure 12:
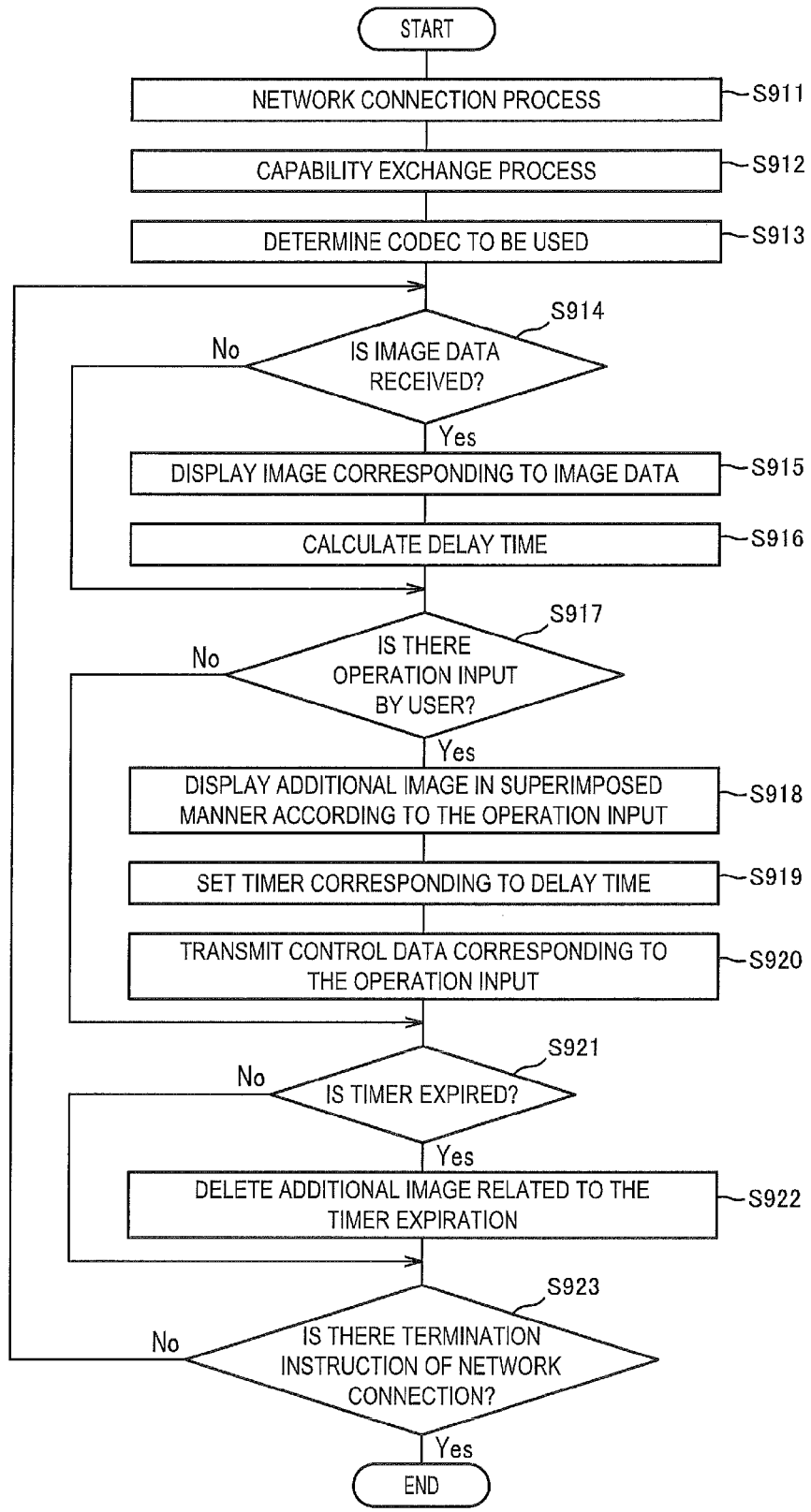
FIG. 12 is a flowchart illustrating an example of a processing procedure of a data communication control process to be performed by the information processing device 300 according to the first embodiment of the present technology.

FIG. 12 is a flowchart illustrating an example of a processing procedure of a data communication control process to be performed by the information processing device 300 according to the first embodiment of the present technology. In addition, in this example, there is illustrated an example of performing short-range wireless communication between the transmission-side information processing device 200 and the reception-side information processing device 300.

Initially, the controller 380 performs a network connection process between the transmission-side information processing device 200 and the reception-side information processing device 300 (step S911). In other words, a connection is set up between the transmission-side information processing device 200 and the reception-side information processing device 300 (step S911).

Subsequently, the controller 380 performs a capability exchange process of exchanging capabilities in the communication with the transmission-side information processing device 200 (step S912). Next, the controller 380 determines a codec (Video Codec) to be used in short-range wireless communication between the transmission-side information processing device 200 and the reception-side information processing device 300 (step S913).

Subsequently, the controller 380 determines whether image data generated by the transmission-side information processing device 200 is received or not (step S914). If it is determined that the image data is not received (NO in step S914), then the process proceeds to step S917. On the other hand, if it is determined that the image data is received (YES in step S914), then the decoder 330 decodes the received image data, and the controller 380 causes the display unit 350 to display a display screen corresponding to the decoded image data (step S915). In addition, step S915 corresponds to an example of the first procedure described in claims.

Subsequently, the controller 380 calculates an approximate delay time between the transmission-side information processing device 200 and the reception-side information processing device 300 (step S916). The controller 380 then holds the calculated delay time.

Subsequently, the controller 380 determines whether an operation input by the user is performed or not (step S917). If it is determined that the operation input by the user is not performed (NO in step S917), then the process proceeds to step S921. On the other hand, if it is determined that the operation input by the user is performed (YES in step S917), then the controller 380 causes an additional image indicating that the operation input is accepted to be displayed by superimposing the additional image on a display screen to be displayed on the display unit 350 at the time when the operation input is accepted (step S918). In addition, step S918 corresponds to an example of the second step described in claims.

Subsequently, the controller 380 sets a timer corresponding to the held delay time (step S919). Next, the controller 380 transmits control data corresponding to the operation input to the transmission-side information processing device 200 (step S920). In addition, step S920 corresponds to an example of the third step described in claims.

Subsequently, the controller 380 determines whether the timer that has been set (the timer corresponding to the delay time) is expired or not (step S921). If it is determined that the timer that has been set is not expired (NO in step S921), then the process proceeds to step S923. On the other hand, if it is determined that the timer that has been set is expired (YES in step S921), then the controller 380 erases an additional images in which the timer is expired (step S922). In addition, if a plurality of user operations are performed, an additional image is displayed for each of the plurality of user operations. In this case, the timer is set for each additional image, and the additional images having the expired timer are erased sequentially.

Subsequently, the controller 380 determines whether an instruction to terminate the network connection is accepted or not (step S923). If it is determined that the termination instruction is accepted (YES in step S923), then the data communication control process is ended. On the other hand, if it is determined that the termination instruction is not accepted (NO in step S923), then the process returns to step S914.

In this example, there is illustrated an example of transmitting control data (S920) after displaying an additional image (step S918), but an additional image may be displayed after transmitting control data.

In this way, in this embodiment of the present technology, when a user operation is performed on a display screen displayed on the display unit 350, an additional image indicating that the user operation is properly accepted (additional image corresponding to the user operation) is immediately displayed in a superimposed manner. This makes it possible to notify quickly the user that the user operation is accepted.

Thus, a visual feedback can be provided on the acceptance of a user operation, and the user can be notified clearly and quickly of the acceptance of a user operation. Therefore, it is possible to provide the user with comfortable operation feeling. In addition, the acceptance of a user operation can be notified clearly and quickly to the user, and thus it is possible to prevent unintended operation.

Moreover, it is possible to prevent an additional image and an image processed by a process based on a user operation from being overlapped by dynamically changing the time period of displaying the additional image according to the delay time. Thus, it is possible to prevent the image processed by a process based on a user operation from being less visible. Therefore, in the embodiment of the present technology, it is possible to allow the user to easily recognize the acceptance condition of a user operation and it is possible to implement a user feedback in consideration of delay caused by remote operation.

2. Second Embodiment

In the first embodiment of the present technology, there has been illustrated the example where the reception-side information processing device calculates a delay time in the communication between two information processing devices and erases an additional image based on the delay time. However, the reception-side information processing device may erase an additional image based on information provided from the transmission-side information processing device.

In the following, in the second embodiment of the present technology, there will be illustrated an example where a reception-side information processing device may erase an additional image based on information provided from a transmission-side information processing device. A communication system (information processing devices constituting the communication system) according to the second embodiment of the present technology has a similar configuration to the communication 100 (information processing devices 200 and 300) shown in FIG. 1 or the like. Thus, the parts in this embodiment similar to those of the communication system 100 and the information processing devices 200 and 300 are denoted with the same reference numerals, and a part of their description is omitted.

[Communication Example]

Figure 13:
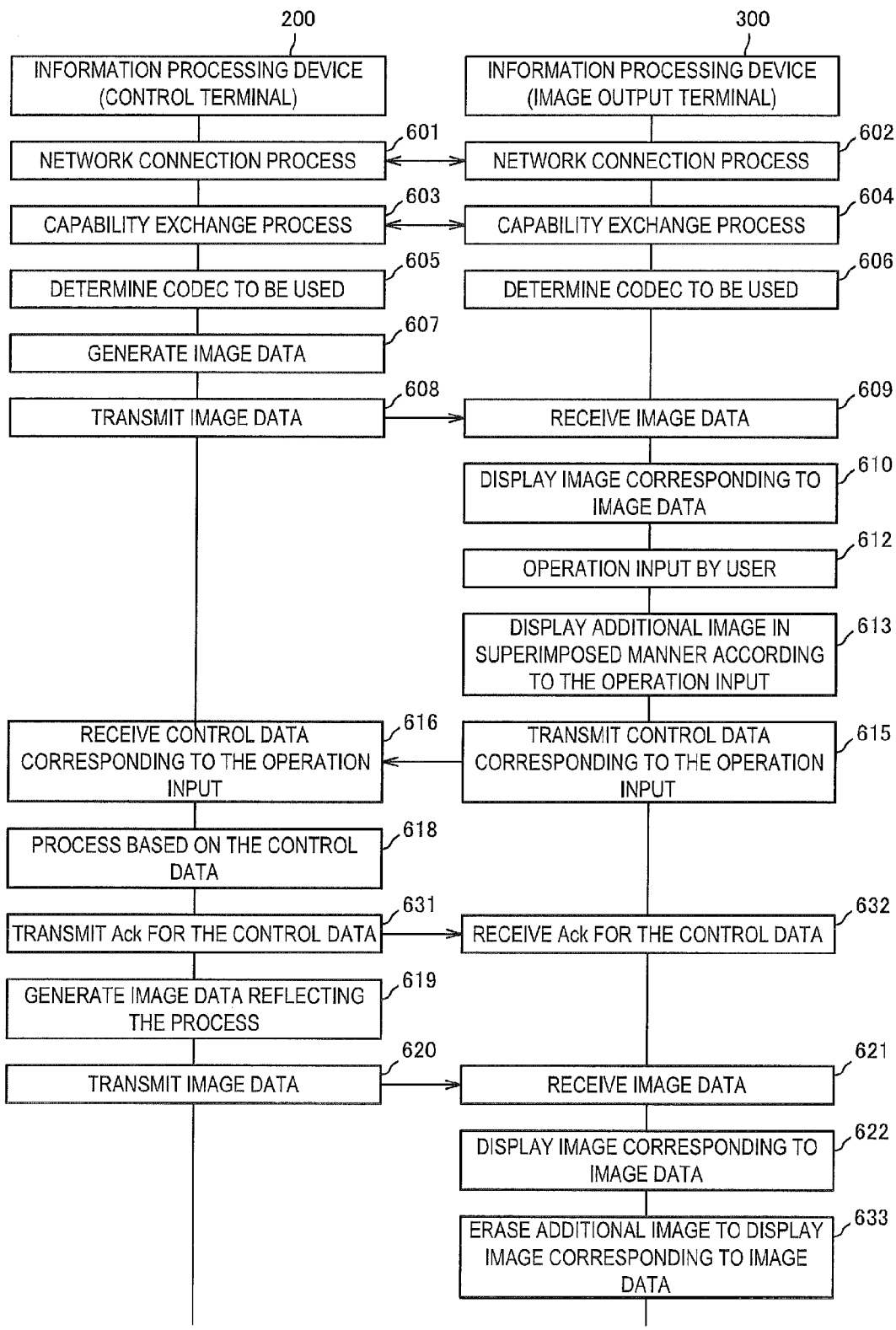
FIG. 13 is a sequence chart illustrating an exemplary communication process to be performed in each device constituting the communication system 100 according to a second embodiment of the present technology.

FIG. 13 is a sequence chart illustrating an exemplary communication process to be performed by each device constituting the communication system 100 according to the second embodiment of the present technology. In addition, FIG. 13 is a modified example of FIG. 10. Thus, parts in this embodiment similar to those of FIG. 10 are denoted with the same reference numerals, and a part of their description is omitted.

In this example, the calculation of delay time (611) and the setting of timer (614) shown in FIG. 10 are not performed.

Moreover, the transmission-side information processing device 200 transmits an Ack (ACKnowledgement) for the received control data to the reception-side information processing device 300 (631 and 632) after performing a process based on the control data (618). In other words, a fact that an operation input corresponding to the received control data is accepted is transmitted to the reception-side information processing device 300 (631 and 632).

Furthermore, the reception-side information processing device 300 may erase (633) the additional image at the timing (632) of receiving the Ack for the control data. However, there is a delay between the transmission-side information processing device 200 and the reception-side information processing device 300, and thus it is preferable to erase the additional image at the timing when the image data in which the process based on the control data is reflected is displayed.

Thus, for example, the transmission-side information processing device 200 may give a sequence number that corresponds to the image data at the time of accepting the control data to an Ack packet for the control data. When the reception-side information processing device 300 receives image data corresponding to the sequence number (or, when displaying image data corresponding to the sequence number), the reception-side information processing device 300 may erase an additional image (633). Here, an Ack packet that stores the sequence number may be used by defining its own packet.

In this way, when the controller 260 of the information processing device 200 receives control data corresponding to a user operation that is accepted in the information processing device 300 from the information processing device 300, the controller 260 controls to transmit data indicating that the control data is received to the information processing device 300. The data indicating that the control data is received, for example, is the Ack shown in 631 and 632 of FIG. 13.

Furthermore, the controller 380 of the information processing device 300, for example, can regard the timing when data indicating that the control data is accepted is received from the information processing device 200 as the timing when the additional image is erased. In addition, the controller 380, for example, can regard the timing when image data corresponding to image data identification information is received from the information processing device 200 as the timing the additional image is erased. The image data identification information is included in data indicating that the control data is accepted by the information processing device 200. Additionally, the controller 380, for example, can regard the timing when an image based on image data corresponding to image data identification information included in data indicating that the control data is accepted by the information processing device 200 is displayed as the timing the additional image is erased. It is noted that the image data identification information is, for example, a sequence number for identifying image data.

[Exemplary Operation of Information Processing Device]

Figure 14:
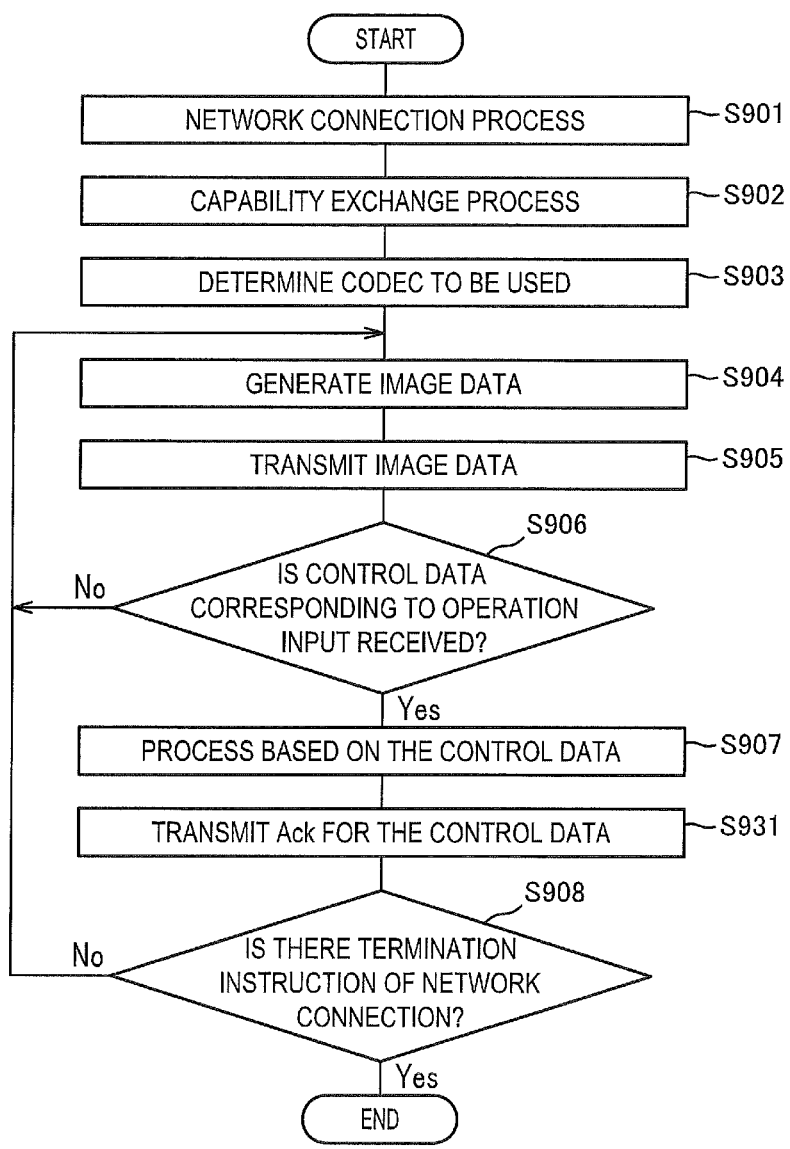
FIG. 14 is a flowchart illustrating an example of a processing procedure of a data communication control process to be performed by the information processing device 200 according to the second embodiment of the present technology.

FIG. 14 is a flowchart illustrating an example of a processing procedure of a data communication control process to be performed by the information processing device 200 according to the second embodiment of the present technology. In addition, FIG. 14 is a modified example of FIG. 11. Thus, parts in this embodiment similar to those of FIG. 11 are denoted with the same reference numerals, and a part of their description is omitted.

After performing a process based on the received control data (step S907), the controller 260 transmits an Ack for the control data to the reception-side information processing device 300 (step S931).

[Exemplary Operation of Information Processing Device]

Figure 15:
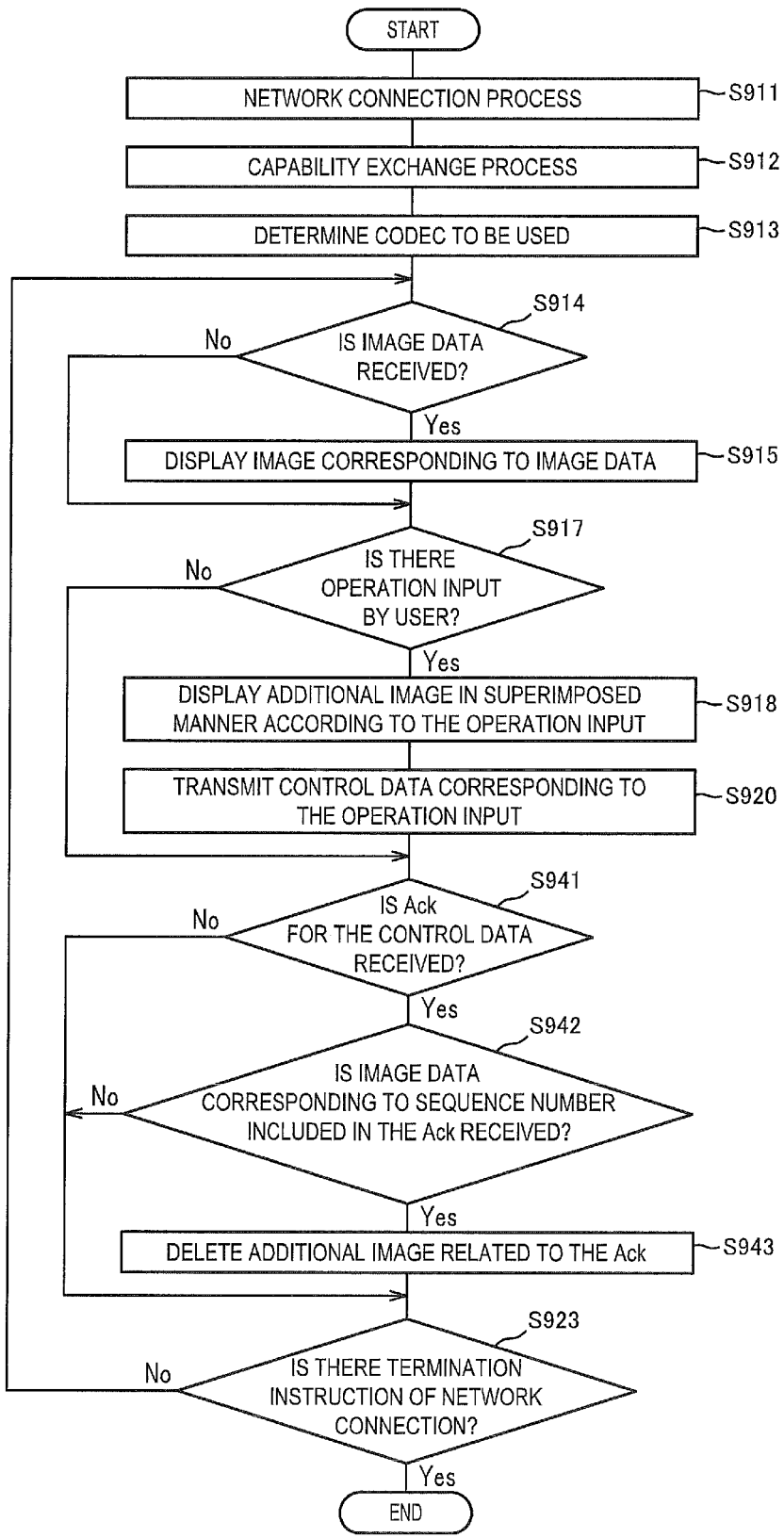
FIG. 15 is a flowchart illustrating an example of a processing procedure of a data communication control process to be performed by the information processing device 300 according to the second embodiment of the present technology.

FIG. 15 is a flowchart illustrating an example of a processing procedure of a data communication control process to be performed by the information processing device 300 according to the second embodiment of the present technology. In addition, FIG. 15 is a modified example of FIG. 12. Thus, parts in this embodiment similar to those of FIG. 12 are denoted with the same reference numerals, and a part of their description is omitted.

After transmitting control data corresponding to the operation input (step S920), the controller 380 determines whether an Ack for the control data is received or not (step S941). If it is determined that the Ack for the control data is received (YES in step S941), then the controller 380 determines whether image data corresponding to a sequence number included in an Ack packet for the control data is received or not (step S942). If it is determined that the image data corresponding to the sequence number is received (YES in step S942), then the controller 380 erases an additional image related to the Ack (step S943).

Furthermore, if it is determined that the Ack for the control data is not received (NO in step S941), then the process proceeds to step S923. In addition, in the case where the Ack for the control data is received, if it is determined that the image data corresponding to the sequence number included in the Ack packet is not received (NO in step S942), then the process proceeds to step S923.

In this way, according to the second embodiment of the present technology, it is possible to properly erase an additional image without calculating the delay time in the communication between two information processing devices.

3. Third Embodiment

In the first and second embodiments of the present technology, there has been illustrated an example of displaying an additional image on the reception-side information processing device. However, an additional image may be displayed on the transmission-side information processing device. In addition, an additional image may be displayed on both information processing devices at the reception and transmission sides. Additionally, an additional image may be displayed on any one of two information processing devices at the reception and transmission sides.

In the following, in the third embodiment of the present technology, there will be illustrated an example of displaying an additional image on two information processing devices at the reception and transmission sides. A communication system (information processing devices constituting the communication system) according to the third embodiment of the present technology has a substantially similar configuration to the communication 100 (information processing devices 200 and 300) shown in FIG. 1 or the like. Thus, parts in this embodiment similar to the communication system 100 and the information processing devices 200 and 300 are denoted with the same reference numerals, and a part of their description is omitted.

[Exemplary Display of Additional Image]

Figure 16:
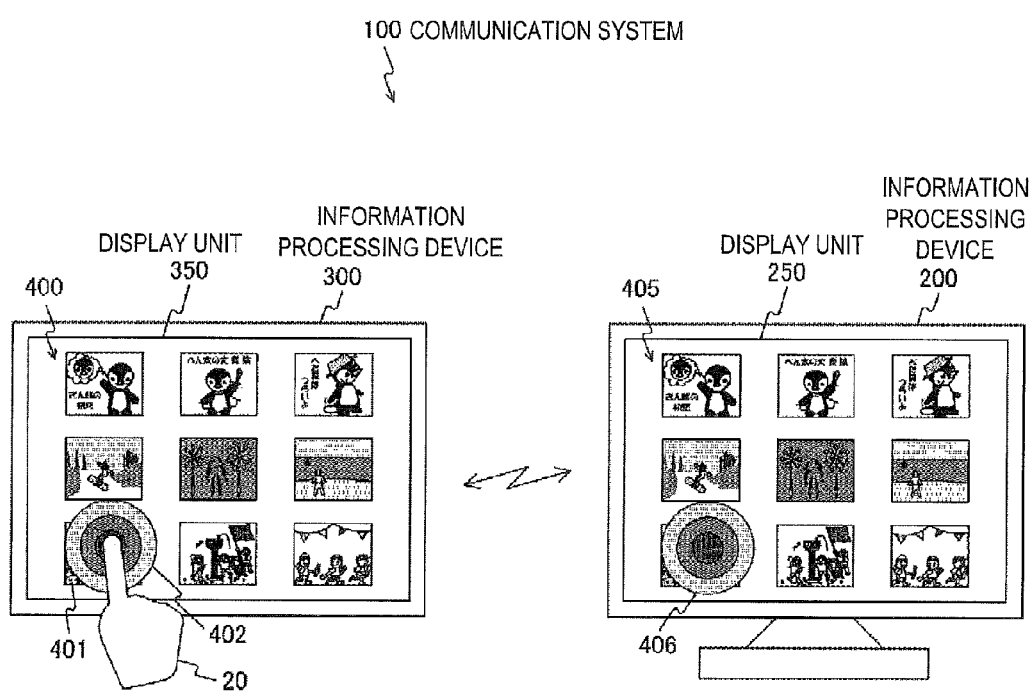
FIG. 16 is a diagram illustrating an exemplary display of each information processing device constituting a communication system 100 according to a third embodiment of the present technology.

FIG. 16 is a diagram illustrating an exemplary display of each information processing device constituting the communication system 100 according to the third embodiment of the present technology. In addition, an exemplary display of the information processing device 300 is similar to b of FIG. 4. Additionally, a display screen identical with the display image displayed on the display unit 350 of the information processing device 300 is displayed on the display unit 250 of the information processing device 200.

Here, the controller 260 of the transmission-side information processing device 200 causes an image (content list screen 405) to be displayed on the display unit 250. The image (content list screen 405) is identical with an image (content list screen 400) to be transmitted to the reception-side information processing device 300. In addition, as described above, in the content list screen 400, it is assumed that a user operation (for example, a pressing operation) of selecting the representative image 401 is performed. In this case, the controller 380 of the reception-side information processing device 300 causes a ripple image (additional image) 402 to be displayed around the selected representative image 401. The controller 380 then transmits control data indicating that the representative image 401 is selected to the transmission-side information processing device 200. In addition, when the control data is received, the controller 260 of the transmission-side information processing device 200 causes a ripple image (additional image) 406 to be displayed on the content list screen 405 based on the control data (for example, type and position of the user operation). In other words, the same ripple images (additional images) 402 and 406 are displayed on the content list screens 400 and 405, respectively, in a superimposed manner.

In this way, immediately after performing the user operation of selecting the representative image 401, the ripple image 402 is displayed, and at the same time, the ripple image 406 can be displayed on the transmission-side information processing device 200 receiving the control data related to the user operation. Thus, the user can recognize clearly, quickly, and easily that his own operation is accepted through any one of the transmission-side information processing device 200 and the reception-side information processing device 300.

Determination as to whether the additional image is displayed on both information processing devices at the reception and transmission sides or the additional image is displayed on any one of the information processing devices at the reception and transmission sides may be settable by an user operation.

In this way, the communication system 100 can be configured to perform at least one of a first operation and a second operation. Here, the first operation is an operation which allows the information processing device 300 to display an additional image indicating that the user operation is accepted by superimposing it on an image displayed on the display unit 350. In addition, the second operation is an operation which allows the information processing device 200 to display an additional image indicating that control data related to the user operation is accepted by superimposing it on an image displayed on the display unit 250.

4. Modified Example

An example of the transmission-side information processing device including the operation acceptance unit and the display unit has been illustrated in FIG. 2. However, an embodiment of the present technology may be applied to an information processing device which does not include an operation acceptance unit and/or a display unit.

In the following, as a modified example, an example of a transmission-side information processing device which does not include an operation acceptance unit and a display unit will be illustrated.

[Exemplary Configuration of Information Processing Device]

Figure 17:
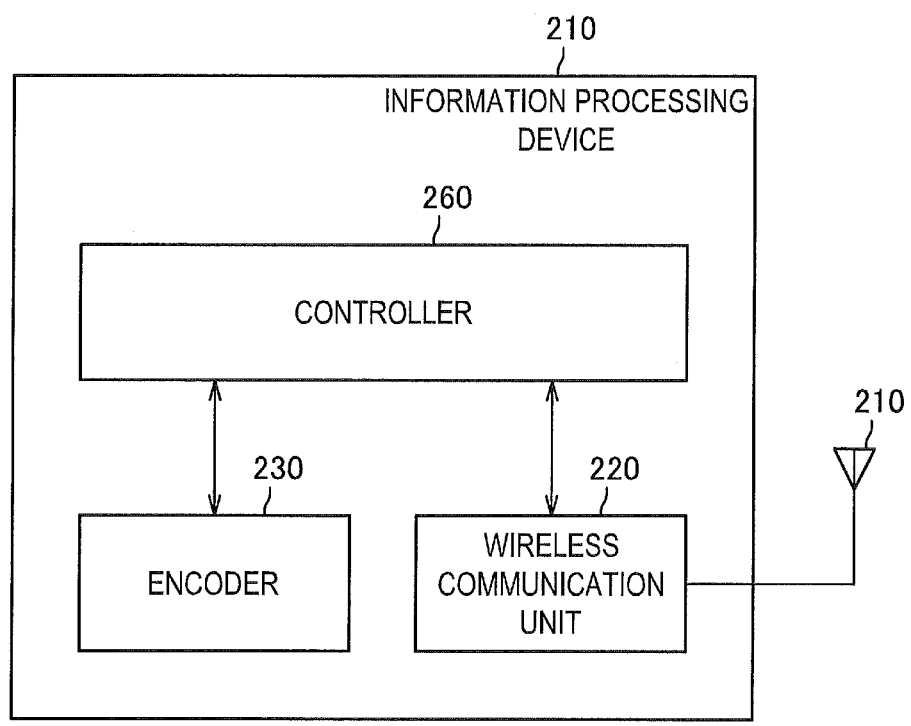
FIG. 17 is a block diagram illustrating an exemplary functional configuration of an information processing device 201 according to a modified example of the present technology.

FIG. 17 is a block diagram illustrating an exemplary functional configuration of an information processing device 201 according to the modified example of the present technology.

The information processing device 201 includes an antenna 210, a wireless communication unit 220, an encoder 230, and a controller 260. In addition, the information processing device 201 is a modified example of the information processing device 200 shown in FIG. 2. Thus, parts in this embodiment similar to those of the information processing device 200 are denoted with the same reference numerals, and a part of their description is omitted.

In this way, an embodiment of the present technology may be applied even when the information processing device 201 which does not include an operation acceptance unit and a display unit is regarded as a transmission-side information processing device.

5. Modified Example

In the first to third embodiments of the present technology, there has been illustrated an example where two information processing devices (information processing devices 200 and 300) are directly connected to each other in a wireless manner. However, other network configurations may be possible.

In the following, in this modified example, there will be illustrated an example of other network configurations. In addition, an information processing device according to the modified example has a substantially similar configuration to examples shown in FIGS. 2 and 3, or the like. Thus, a part of descriptions common to the first to third embodiments of the present technology is omitted.

[Exemplary Configuration of Communication System]

Figure 18:
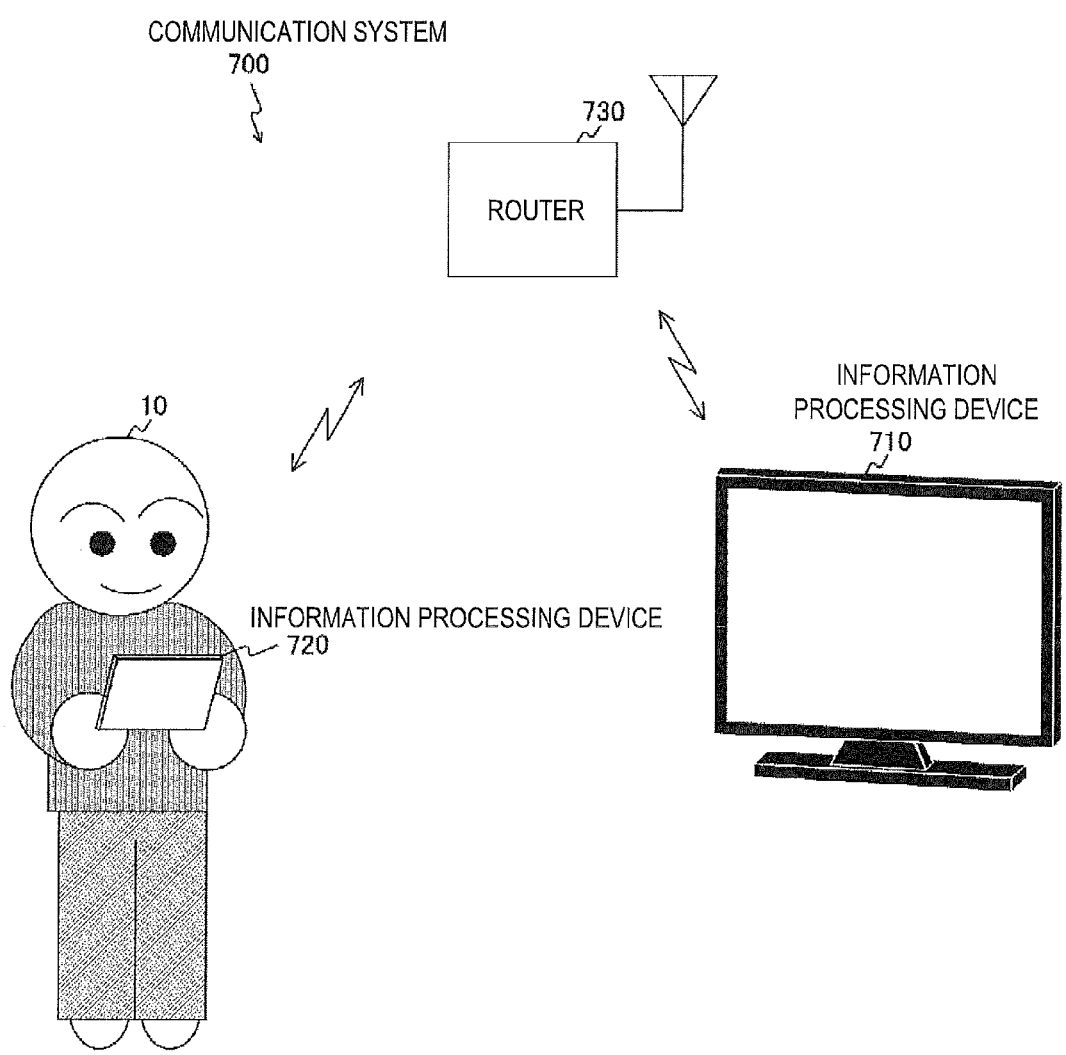
FIG. 18 is a diagram illustrating an exemplary configuration of a communication system 700 according to a modified example of the present technology.

FIG. 18 is a diagram illustrating an exemplary configuration of a communication system 700 according to a modified example of the present technology. In FIG. 18, there is illustrated an exemplary system configuration when two information processing devices (information processing devices 710 and 720) are wirelessly connected to each other via a router 730.

The communication system 700 includes an information processing device 710, an information processing device 720, and the router 730. In addition, the information processing device 710 corresponds to the information processing device 200 shown in FIG. 1, and the information processing device 720 corresponds to the information processing device 300 shown in FIG. 1.

Furthermore, although FIG. 18 illustrates an example where two information processing devices (the information processing devices 710 and 720) are wirelessly connected using the router 730, two information processing devices may be connected to each other using other relay devices. As an example, two information processing devices (the information processing devices 710 and 720) may be connected to each other via an access point (wireless LAN access point).

[Exemplary Configuration of Communication System]

Figure 19:
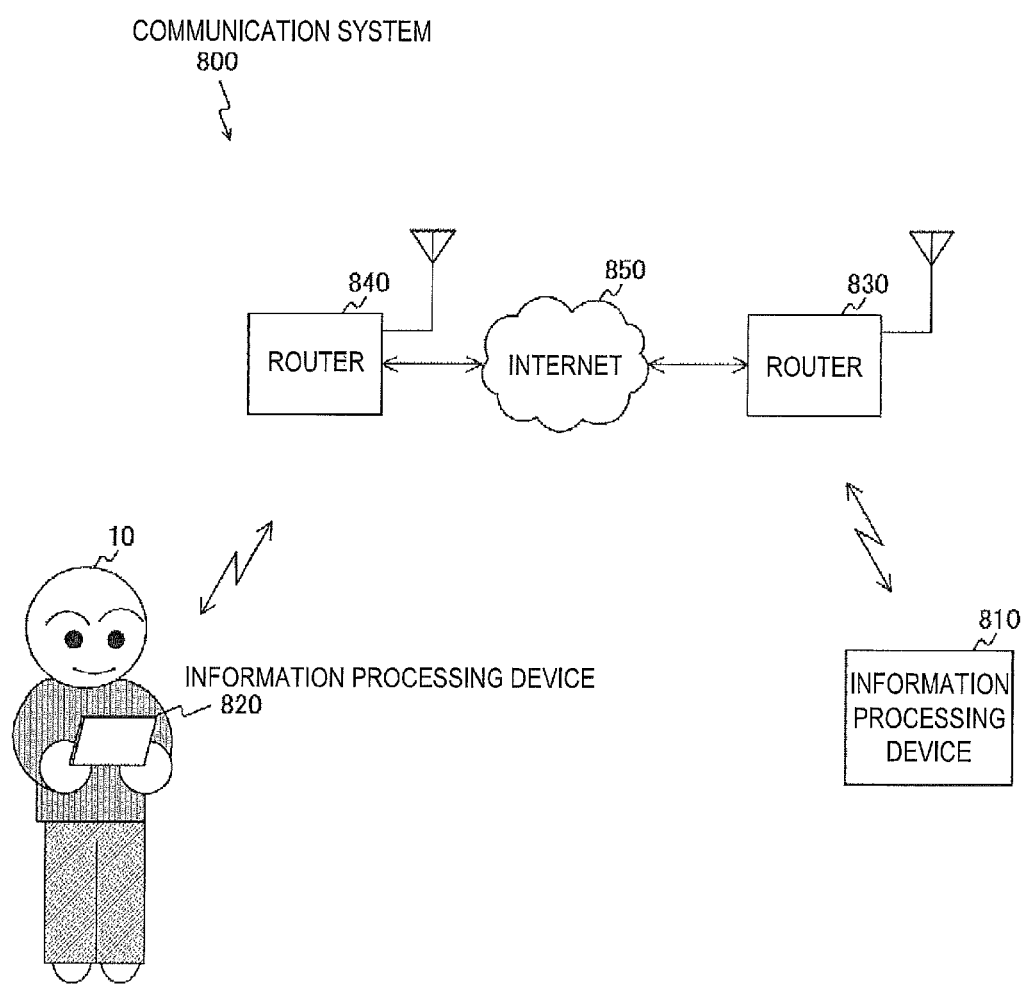
FIG. 19 is a diagram illustrating an exemplary configuration of a communication system 800 according to a modified example of the present technology.

FIG. 19 is a diagram illustrating an exemplary configuration of a communication system 800 according to a modified example of the present technology. In FIG. 19, there is illustrated an example of a system configuration in a case where two information processing devices (information processing devices 810 and 820) are wirelessly connected to each other via the Internet 850.

The communication system 800 includes an information processing device 810, an information processing device 820, routers 830 and 840, and the Internet 850. In addition, the information processing device 810 corresponds to the information processing device 200 shown in FIG. 1, and the information processing device 820 corresponds to the information processing device 300 shown in FIG. 1.

Furthermore, although FIG. 19 illustrates an example where two information processing devices (the information processing devices 810 and 820) are wirelessly connected via the Internet 850, two information processing devices may be wirelessly connected to each other via other networks (for example, public line networks).

As illustrated in FIG. 19, an image in a remote location can be controlled via the Internet 850. Thus, the embodiment of the present technology can be implemented without depending on a network path between a control terminal and an image output terminal.

Moreover, in the embodiment of the present technology, there has been illustrated an example of visually outputting notification information that is used to issue a notification that a user operation is accepted (an example of displaying an additional image). However, other type of notification information may be output. For example, notification information may be output in an audible way by outputting sound that is used to issue a notification that a user operation is accepted. In addition, for example, notification information may be output by vibrating the information processing device to issue a notification that a user operation is accepted.

In the embodiment of the present technology, although there has been described the example of a display device or portable information processing device equipped with a wireless communication function, the embodiment of the present technology can be applied to other types of information processing devices. As an example, the embodiment of the present technology can be applied to an information processing device such as home game machines, portable video processing devices, handheld game consoles, digital still cameras, digital video cameras (for example, a camera integrated recorder), digital photo frames. In addition, for example, the embodiment of the present technology can be applied to an information processing device capable of performing wireless communications (for example, a personal computer with no wireless communication function) by attaching a wireless communication device equipped with a wireless communication function.

Note that the above described embodiments show examples of embodying the present disclosure, and there is a correspondence between the features in the embodiments and the respective features of the present disclosure. Similarly, there is a correspondence between the features of the present disclosure and the respective features in the embodiments of the present disclosure with the same reference numerals. However, the present disclosure is not limited to the embodiments, and can embody various modifications which do not deviate from the scope of the present disclosure.

Further, the procedures described in each of the aforementioned embodiments may be understood as a method including a series of these procedures, and may be understood as a program for causing a computer to execute the series of these procedures or a recording medium storing the program therein. As the recording medium, for example, a hard disk, a CD (a Compact Disc), an MD (a MiniDisc), a DVD (a Digital Versatile Disk), a memory card, or Blu-ray Disc (registered trademark) can be used.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:
an operation acceptance unit configured to accept a user operation related to an image based on image data received from another information processing device using short-range wireless communication when the image is displayed on a display unit; and
a controller configured to perform control in a manner that notification information for issuing a notification that the user operation is accepted is output when the user operation is accepted, and control data corresponding to the user operation is transmitted to the other information processing device.

(2) The information processing device according to (1), wherein the controller causes the notification information to be output by superimposing an additional image indicating that the user operation is accepted on the image displayed on the display unit.

(3) The information processing device according to (2), wherein the operation acceptance unit and the display unit include a touch panel,
wherein the user operation is a contact operation or a proximity operation to the touch panel, and
wherein the controller causes the additional image to be displayed by using a position in the touch panel at which the contact operation or the proximity operation is accepted as a reference when the contact operation or the proximity operation to the touch panel is accepted.

(4) The information processing device according to (3), wherein the controller causes a ripple image to be displayed as the additional image when a pressing operation of pressing an operation image on the touch panel is accepted, the ripple image being centered on a position in the touch panel at which the pressing operation is accepted, and
wherein the controller causes an image indicating a trajectory of a tracing operation in the touch panel to be displayed as the additional image when the tracing operation of tracing an operation image on the touch panel is accepted.

(5) The information processing device according to any one of (2) to (4), wherein the controller causes the additional image to be erased at a predetermined timing.

(6) The information processing device according to (5), wherein the controller determines the predetermined timing based on a delay time occurred in the short-range wireless communication with the other information processing device.

(7) The information processing device according to (5), wherein the controller regards a timing of receiving data indicating that the control data is accepted from the other information processing device as the predetermined timing.

(8) The information processing device according to (5), wherein the controller regards a timing of receiving image data corresponding to image data identification information from the other information processing device or a timing of displaying an image based on the image data as the predetermined timing, the image data identification information being included in data indicating that the other information processing device accepts the control data.

(9) The information processing device according to (1) or (2), further including:
a posture detection unit configured to detect a posture of the information processing device,
wherein the user operation is an operation performed by changing the posture of the information processing device, and
wherein the controller causes the notification information for issuing a notification that the user operation based on the change is accepted to be output when the posture of the information processing device is changed.

(10) The information processing device according to (9), wherein when the posture of the information processing device is changed, the controller causes the notification information to be output by superimposing an additional image visually indicating the change on an image displayed on the display unit.

(11) A communication system including:
a first information processing device; and
a second information processing device,
wherein the first information processing device causes an image based on image data received from the second information processing device using short-range wireless communication to be displayed on a first display unit, and transmits control data corresponding to a user operation related to the image to the second information processing device when the user operation is accepted, wherein the second information processing device transmits image data that is used to display the image on the first information processing device using the short-range wireless communication while causing an image identical with the image to be displayed on a second display unit and transmitting data indicating that the control data is received to the first information processing device when the control data is received from the first information processing device, and wherein at least one of a first operation and a second operation is performed, the first operation allowing the first information processing device to superimpose an additional image indicating that the user operation is accepted on the image displayed on the first display unit, the second operation allowing the second information processing device to superimpose an additional image indicating that the control data is accepted on the image displayed on the second display unit.

(12) An information processing method including:

a first procedure of causing an image based on image data received from another information processing device using short-range wireless communication to be displayed on a display unit;

a second procedure of causing notification information for issuing a notification that a user operation related to an image displayed on the display unit is accepted to be output when the user operation is accepted; and a third procedure of transmitting control data corresponding to the user operation to the other information processing device.

What is claimed is:

1. A first information processing device, comprising:
an operation acceptance unit configured to:
display a first image on a display unit;
accept a user operation on the displayed first image,
wherein the first image is received from a second information processing device, and
wherein the user operation is received via a short-range wireless communication; and
a controller configured to:
output notification information to issue a notification, based on the user operation is accepted,
wherein the notification information indicates that the user operation on the displayed first image is accepted;
transmit control data, corresponding to the user operation, to the second information processing device; and
erase the notification on the first information processing device based on a sequence number,
wherein the sequence number corresponds to an additional image, and
wherein the sequence number is received from the second information processing device based on the transmitted control data.

2. The first information processing device according to claim 1,
wherein the controller is further configured to superimpose the notification information on the displayed first image, to indicate that the user operation is accepted on the first image displayed on the display unit, and
wherein the superimposed notification information is the additional image.

3. The first information processing device according to claim 2,
wherein the display unit includes a touch panel, wherein the user operation is one of a contact operation or a proximity operation to the touch panel,
wherein the controller is further configured to display the additional image based on a first position in the touch panel at which one of the contact operation or the proximity operation is accepted as a reference.

4. The first information processing device according to claim 3, wherein the controller is further configured to:
display a ripple image as the additional image based on a pressing operation of pressing a first operation image on the touch panel is accepted,
wherein the ripple image is centered on a second position in the touch panel at which the pressing operation is accepted; and
display a second image to indicate a trajectory of a tracing operation in the touch panel as the additional image, based on the tracing operation of tracing a second operation image on the touch panel is accepted.

5. The first information processing device according to claim 2, wherein the controller is further configured to erase the additional image.

6. The first information processing device according to claim 5, wherein the controller is further configured to determine a time for the erase of the additional image, based on a delay time occurred in the short-range wireless communication with the second information processing device.

7. The first information processing device according to claim 5,
wherein the controller is further configured to determine a time to receive acknowledgment data, indicating that the control data is accepted, from the second information processing device.

8. The first information processing device according to claim 5,
wherein the controller is further configured to determine a time to erase the additional image based on a time of receipt of image data from the second information processing device
wherein the image data correspond to image data identification information, and
wherein the image data identification information is included in acknowledgment data indicating that the second information processing device has accepted the control data.

9. The first information processing device according to claim 5, wherein the controller is further configured to determine a time for the erase of the additional image based on a round trip time value of packet data exchanged in an exchange of capability information with the second information processing device.

10. The first information processing device according to claim 1, further comprising a posture detection unit configured to detect a posture of the first information processing device,
wherein the user operation is an operation by a change in the posture of the first information processing device,
wherein the controller is further configured to output the notification information based on the posture of the information processing device is changed, and
wherein the notification information issues the notification that the user operation based on the change in the posture is accepted.

11. The first information processing device according to claim 10,
wherein, based on the posture of the first information processing device is changed, the controller is further configured to superimpose the notification information on the displayed first image, to visually indicate a change on the first image displayed on the display unit, and wherein the superimposed notification information is an additional image.

12. The first information processing device according to claim 1, wherein the notification is issued based on a delay time in the short-range wireless communication with the second information processing device is above a threshold.

13. The first information processing device according to claim 1, wherein the controller is further configured to output the notification information by superimposition of a plurality of additional images indicating a plurality of user operations on the first image displayed on the display unit, wherein the plurality of additional images are erased based on a time associated with each of the plurality of the additional images.

14. The first information processing device according to claim 1, wherein the notification information comprises a second image, and wherein at least one of a color or a shape of the second image is based on a type of the user operation.

15. The first information processing device according to claim 14, wherein the type of user operation includes at least one of a press, a double click, a pinch, an enlargement, or a reduction on the first image.

16. The first information processing device according to claim 1, wherein the controller is further configured to:

exchange capability information with the second information processing device, and receive the first image based on the exchanged capability information.

17. A communication system, comprising:

a first information processing device; and a second information processing device, wherein the first information processing device is configured to:

display a first image, received from the second information processing device via a short-range wireless communication, on a first display unit, output notification information to issue a notification, based on a user operation on the first image is accepted, wherein the notification information indicates that the user operation on the first image is accepted, transmit control data, corresponding to the user operation on the first image, to the second information processing device based on the user operation on the displayed first image is accepted, and erase the notification on the first information processing device based on a sequence number, wherein the sequence number corresponds to an additional image, and wherein the sequence number is received from the second information processing device based on the transmitted control data wherein the second information processing device is configured to:

transmit image data that is used to display the first image on the first information processing device via the short-range wireless communication, display a third image identical with the first image on a second display unit, and transmit data indicating that the control data is received by the second information processing device based on the control data is received from the first information processing device.

18. An information processing method, comprising:

in a first information processing device:

displaying a first image, received from a second information processing device via a short-range wireless communication, on a display unit;

outputting notification information for issuing a notification, based on a user operation on the displayed first image is accepted, wherein the notification information indicates that the user operation on the displayed first image is accepted;

transmitting control data, corresponding to the user operation, to the second information processing device; and erasing the notification on the first information processing device based on a sequence number, wherein the sequence number corresponds to an additional image, and wherein the sequence number is received from the second information processing device based on the transmitted control data.

* * * * *